United States Patent
Nobusawa et al.

(10) Patent No.: US 9,445,430 B2
(45) Date of Patent: Sep. 13, 2016

(54) WIRELESS COMMUNICATION SYSTEM

(71) Applicant: Sharp Kabushiki Kaisha, Osaka-shi, Osaka (JP)

(72) Inventors: Yuichi Nobusawa, Osaka (JP); Shuichi Takehana, Osaka (JP); Toshiaki Kameno, Osaka (JP); Hidenobu Fukumasa, Osaka (JP); Shusaku Fukumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 29 days.

(21) Appl. No.: 14/429,432

(22) PCT Filed: Oct. 10, 2013

(86) PCT No.: PCT/JP2013/077549
§ 371 (c)(1),
(2) Date: Mar. 19, 2015

(87) PCT Pub. No.: WO2014/061537
PCT Pub. Date: Apr. 24, 2014

(65) Prior Publication Data
US 2015/0237651 A1    Aug. 20, 2015

(30) Foreign Application Priority Data

Oct. 16, 2012  (JP) ................................. 2012-228833
Mar. 15, 2013  (JP) ................................. 2013-053212

(51) Int. Cl.
*H04W 74/04*   (2009.01)
*H04W 72/04*   (2009.01)
(Continued)

(52) U.S. Cl.
CPC ............ *H04W 74/006* (2013.01); *H04L 5/005* (2013.01); *H04L 5/0076* (2013.01); *H04W 4/005* (2013.01); *H04W 4/08* (2013.01); *H04W 8/186* (2013.01); *H04W 72/042* (2013.01); *H04W 88/08* (2013.01)

(58) Field of Classification Search
None
See application file for complete search history.

(56) References Cited

U.S. PATENT DOCUMENTS

2007/0019553 A1   1/2007  Sagfors et al.
2007/0097938 A1   5/2007  Nylander et al.
(Continued)

FOREIGN PATENT DOCUMENTS

JP   2007-060212 A   3/2007
JP   2009-502093 A   1/2009
(Continued)

OTHER PUBLICATIONS

Tominaga et al., "Smart Grid from the Viewpoint of ICT [II]," The Journal of Institute of Electronics, Information and Communication Engineers, vol. 95, No. 1, 2012, 10 pages.
(Continued)

Primary Examiner — Timothy J Weidner
(74) Attorney, Agent, or Firm — Keating & Bennett, LLP

(57) ABSTRACT

A wireless communication system is provided in which a plurality of MTC devices can connect to a base station device efficiently. Each of MTC devices in group A that transmits data to the base station device using a predetermined application format is allocated first radio resource common in group A. The MTC device transmits an access request signal to the base station device using the first radio resource. The base station device receives the request signal from the MTC device. The base station device allocates second radio resource common in group A to the MTC device. The MTC device transmits data to the base station device using the second radio resource.

4 Claims, 29 Drawing Sheets

(51) Int. Cl.

| | |
|---|---|
| *H04W 4/08* | (2009.01) |
| *H04W 74/00* | (2009.01) |
| *H04W 4/00* | (2009.01) |
| *H04L 5/00* | (2006.01) |
| *H04W 8/18* | (2009.01) |
| *H04W 88/08* | (2009.01) |

(56) References Cited

U.S. PATENT DOCUMENTS

| | | |
|---|---|---|
| 2007/0097939 A1 | 5/2007 | Nylander et al. |
| 2007/0097983 A1 | 5/2007 | Nylander et al. |
| 2007/0105527 A1 | 5/2007 | Nylander et al. |
| 2007/0105568 A1 | 5/2007 | Nylander et al. |
| 2007/0127522 A1 | 6/2007 | Lundh et al. |
| 2007/0183427 A1 | 8/2007 | Nylander et al. |
| 2008/0151818 A1 | 6/2008 | Brueck et al. |
| 2008/0186893 A1 | 8/2008 | Kolding et al. |
| 2015/0237649 A1* | 8/2015 | Zhang ............... H04W 72/1284 370/329 |

FOREIGN PATENT DOCUMENTS

| | | |
|---|---|---|
| JP | 2009-510969 A | 3/2009 |
| JP | 2009-517968 A | 4/2009 |
| JP | 2010-514357 A | 4/2010 |
| JP | 2010-518721 A | 5/2010 |

OTHER PUBLICATIONS

Lien et al., "Toward Ubiquitous Massive Accesses in 3GPP Machine-to-Machine Communications," IEEE Communications Magazine, Apr. 2011, pp. 66-74.

Matsumoto et al., "Performance Evaluation of IDMA for Small Packet Transmission," The Institute of Electronics, Information and Communication Engineers, RCS2011-342, Mar. 2012, pp. 157-162.

Ping et al., "The OFDM-IDMA Approach to Wireless Communication Systems," IEEE Wireless Communications, Jun. 2007, pp. 18-24.

Ikeda et al., "Standardization Activity on Cellular-Based Machine-to-Machine Communication," Panasonic Technical Journal, vol. 57, No. 1, Apr. 2011, pp. 60-62.

Lien et al., "Massive Access Management for QoS Guarantees in 3GPP Machine-to-Machine Communications," IEEE Communications Letters, vol. 15, No. 3, Mar. 2011, pp. 311-313.

* cited by examiner

FIG.4

| SERVICE FIELDS | APPLICATIONS | SERVICE PROVIDER | GROUP ID |
|---|---|---|---|
| SECURITY | BUILDING MAINTENANCE (MONITORING CAMERA) | COMPANY A | 0001 |
| | | COMPANY B | 0002 |
| | AUTOMOBILES | COMPANY C | 0003 |
| | | COMPANY D | 0004 |
| MEDICAL CARE | HEART RATE, BODY TEMPERATURE, BLOOD PRESSURE, ETC | COMPANY E | 0005 |
| | | COMPANY F | 0006 |
| | ELDERLY SUPPORTS | COMPANY G | 0007 |
| | | COMPANY H | 0008 |
| MEASUREMENT | POWER (ELECTRIC METER) | COMPANY I | 0009 |
| | | COMPANY J | 0010 |
| | GAS | COMPANY K | 0011 |
| | | COMPANY L | 0012 |
| | WATER | COMPANY M | 0013 |
| | | COMPANY N | 0014 |

FIG.8

| 8 |
|---|
| NUMBER OF SUB GROUPS($N_{Gr}$) |
| NUMBER OF DEVICES($N_A$) |
| DEVICE $ID_{A1}$ |
| DEVICE $ID_{A2}$ |
| ... |
| DEVICE $ID_{A_N}$ |
| RESOURCE INFORMATION$_{VA}$ |
| $MCS_A$ |
| $TF_A$ |
| NUMBER OF DEVICES($N_B$) |
| DEVICE $ID_{B1}$ |
| DEVICE $ID_{B2}$ |
| ... |
| DEVICE $ID_{B_N}$ |
| RESOURCE INFORMATION$_{VB}$ |
| $MCS_B$ |
| $TF_B$ |

FIG.10

| | ⌐ 10 |
|---|---|
| DEVICE ID | 16 BITS |
| MOVING IMAGE DATA | 300k BIT |

FIG.11

| | | ⌐11 |
|---|---|---|
| DEVICE ID | 16 BITS | |
| POWER CONSUMPTION | 16 BITS | |

FIG.21 PRIOR ART

| QCI (QoS class identifier) | Resource Type | Priority | Packet Delay Budget | Packet Error Loss Rate | Example Services |
|---|---|---|---|---|---|
| 1 | GBR (Guaranteed bit rate) | 2 | 100ms | $10^{-2}$ | Conversational Voice |
| 2 | | 4 | 150ms | $10^{-3}$ | Conversational Video (Live Streaming) |
| 3 | | 3 | 50ms | $10^{-3}$ | Real Time Gaming |
| 4 | | 5 | 300ms | $10^{-6}$ | Non-Conversational Video (Buffered Streaming) |
| 5 | Non-GBR | 1 | 100ms | $10^{-6}$ | IMS Signalling |
| 6 | | 6 | 300ms | $10^{-6}$ | Video (Buffered Streaming) TCP-based (e.g., www, e-mail, chat, ftp, p2p file sharing, progressive video, etc.) |
| 7 | | 7 | 100ms | $10^{-3}$ | Voice, Video (Live Streaming) Interactive Gaming |
| 8 | | 8 | 300ms | $10^{-6}$ | Video (Buffered Streaming) TCP-based (e.g., www, e-mail, chat, ftp, p2p file sharing, progressive video, etc.) |
| 9 | | 9 | | | |

FIG.24

| SERVICE FIELDS | APPLICATIONS | SERVICE PROVIDER | GROUP ID | INDIVIDUAL ID | IMEI |
|---|---|---|---|---|---|
| SECURITY | BUILDING MAINTENANCE (MONITORING CAMERA) | COMPANY A | 0001 | 00001~01000 | 00001~01000 |
| | | COMPANY B | 0002 | 01001~02000 | 01001~02000 |
| | AUTOMOBILES | COMPANY C | 0003 | 02001~03000 | 02001~03000 |
| | | COMPANY D | 0004 | 03001~04000 | 03001~04000 |
| MEDICAL CARE | HEART RATE, BODY TEMPERATURE, BLOOD PRESSURE, ETC | COMPANY E | 0005 | 04001~05000 | 04001~05000 |
| | | COMPANY F | 0006 | 05001~06000 | 05001~06000 |
| | ELDERLY SUPPORTS | COMPANY G | 0007 | 06001~07000 | 06001~07000 |
| | | COMPANY H | 0008 | 07001~08000 | 07001~08000 |
| MEASUREMENT | POWER (ELECTRIC METER) | COMPANY I | 0009 | 08001~09000 | 08001~09000 |
| | | COMPANY J | 0010 | 09001~10000 | 09001~10000 |
| | GAS | COMPANY K | 0011 | 10001~11000 | 10001~11000 |
| | | COMPANY L | 0012 | 11001~12000 | 11001~12000 |
| | WATER | COMPANY M | 0013 | 12001~13000 | 12001~13000 |
| | | COMPANY N | 0014 | 13001~14000 | 13001~14000 |

4A

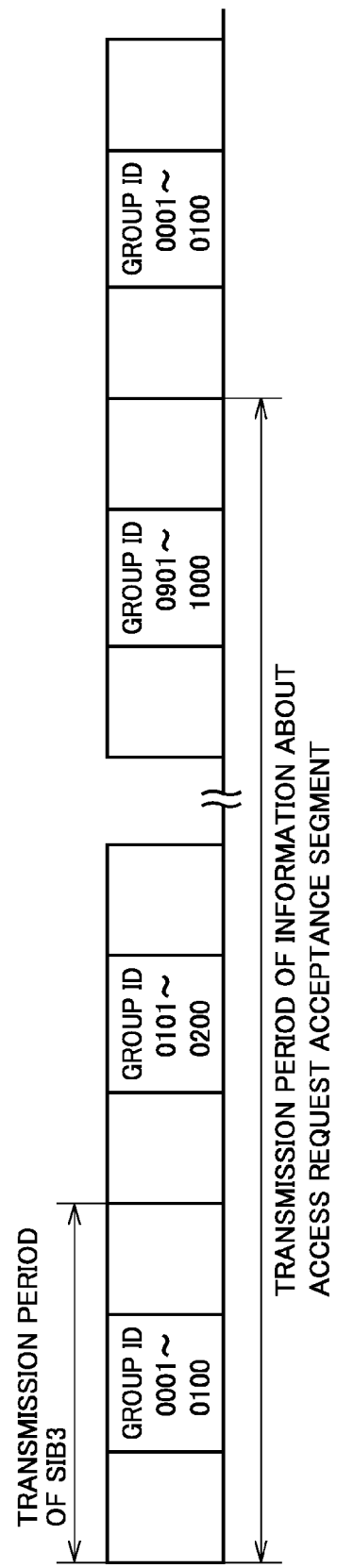

FIG.29

| FREQUENCY OF COMMUNICATION | AVERAGE DATA BLOCK SIZE | GROUP ID | INDIVIDUAL ID | IMEI |
|---|---|---|---|---|
| LESS THAN ONCE A MONTH | LESS THAN 100kB | 0001 | 00001~01000 | 00001~01000 |
| | 100kB OR MORE, LESS THAN 1MB | 0002 | 01001~02000 | 01001~02000 |
| | 1MB OR MORE, LESS THAN 10MB | 0003 | 02001~03000 | 02001~03000 |
| | 10MB OR MORE | 0004 | 03001~04000 | 03001~04000 |
| ONCE OR MORE A MONTH LESS THAN ONCE A WEEK | LESS THAN 100kB | 0005 | 04001~05000 | 04001~05000 |
| | 100kB OR MORE, LESS THAN 1MB | 0006 | 05001~06000 | 05001~06000 |
| | 1MB OR MORE, LESS THAN 10MB | 0007 | 06001~07000 | 06001~07000 |
| | 10MB OR MORE | 0008 | 07001~08000 | 07001~08000 |
| ONCE OR MORE A WEEK LESS THAN ONCE A DAY | LESS THAN 100kB | 0009 | 08001~09000 | 08001~09000 |
| | 100kB OR MORE, LESS THAN 1MB | 0010 | 09001~10000 | 09001~10000 |
| | 1MB OR MORE, LESS THAN 10MB | 0011 | 10001~11000 | 10001~11000 |
| | 10MB OR MORE | 0012 | 11001~12000 | 11001~12000 |
| ONCE OR MORE A DAY | LESS THAN 100kB | 0013 | 12001~13000 | 12001~13000 |
| | 100kB OR MORE, LESS THAN 1MB | 0014 | 13001~14000 | 13001~14000 |
| | 1MB OR MORE, LESS THAN 10MB | 0015 | 14001~15000 | 14001~15000 |
| | 10MB OR MORE | 0016 | 15001~16000 | 15001~16000 |

WIRELESS COMMUNICATION SYSTEM

TECHNICAL FIELD

The present invention relates to a wireless communication system, a base station device, a communication device, a communication control method, and a program. More specifically, the present invention relates to a wireless communication system including a plurality of communication devices performing machine communication, a base station device included in the wireless communication system, a communication device, a communication control method in the wireless communication system, the base station device and the communication devices, and a program for controlling the base station device and the communication devices.

BACKGROUND ART

Conventionally, public wireless communication systems such as LTE (Long Term Evolution) can provide a variety of services to users through packet access. In such public wireless communication systems, the required information rate, delay, and others vary among services. The public wireless communication systems therefore prepare a plurality of classes depending on QoS (Quality of Service) and set a proper bearer for each service. FIG. 21 is a diagram illustrating classification in LTE. Referring to FIG. 21, nine classes are prepared in LTE.

The field of MTC (Machine Type Communication) has recently attracted attention, in which machines perform communication (machine communication) with each other without involving user's operation. MTC finds a wide variety of applications including security, medical care, agriculture, factory automation, and life line control. Among the applications of MTC, in particular, smart grids have attracted attention, which allow efficient transmission and distribution of energy by integrating, for example, information of electric power measured by a measurer called a smart meter, as illustrated in NPD 1 below.

Communications between MTC devices and between an MTC server managing MTC devices and an MTC device are expected to increasingly grow in the future. At present, as described in NPD 2, studies have been carried out to apply a system using a 3GPP (Third Generation Partnership Project) network such as LTE or a system using a short-range communication system in accordance with the IEEE 802.15 standard, to such communications.

MTC involves an extremely large number of devices and thus may require an enormous amount of control signals. In this respect, NPD 2 below proposes a grouping-based MTC management method. In this MTC management method, MTC devices that require various QoS are grouped according to permissible values of QoS, and AGTI (Access Grant Time Interval) corresponding to each group is allocated to each MTC device.

As a communication system for MTC devices, for example, the IDMA (Interleave Division Multiple Access) system is drawing attention, as described in NPD 3. According to NPD 3, the advantages of using the IDMA system in MTC communications include eliminating the need for scheduling and effectively applying a multi user interference canceller.

The signal receiving and demodulating processing in the IDMA system will be described below. For a channel in mobile communication, it is particularly effective to use a system called OFDM-IDMA, which uses IDMA and OFDM (Orthogonal Frequency Division Multiplexing) in combination. NPD 4 below explains the principle of the OFDM-IDMA. FIG. 22 is a diagram illustrating the principle of the OFDM-IDMA.

Referring to FIG. 22, each MTC device of each user encodes data to be transmitted with an encoder. Each MTC device then interleaves the encoded data with an interleaver. Each MTC device then modulates the interleaved signal. Each MTC device then performs inverse discrete Fourier transform of the modulated signal. A transmission signal is thus generated in each MTC device. An encoder common to the MTC devices is used. An interleaver different among devices is used.

The signal input to the antenna of a base station device is a mixture of signals from a plurality of MTC devices. The signal input to the antenna of the base station device additionally includes noise and interference. The base station device performs discrete Fourier transform of the signal. The base station device then performs MUD (Multi User Detection) on the signal obtained by discrete Fourier transform. The base station device thus separates the received signal into signals of individual users. MUD extracts a signal component of each user from the signal including a mixture of signals from a plurality of users. MUD adopts a method of gradually reducing interference components through iterative processing for the IDMA signal.

FIG. 23 is a diagram illustrating the operation of MUD. Referring to FIG. 23, the signal DFT-processed in the base station device is sent to an ESE (Elementary Signal Estimator). The ESE obtains the mean and variance for each bit, using Gaussian approximation. The ESE sends the means and variance to a deinterleaver corresponding to the interleaver of each user. The deinterleaver sends the deinterleaved signal (output) to an APP (A Posteriori Probability) decoder. The APP decoder performs decoding of a received sequence of log-likelihoods of channel bits, outputs the decoding result as a decoded signal for each user, and encodes it again for output to the interleaver with improved accuracy of the log-likelihood information. The ESE re-calculates the mean and variance based on the likelihood information of the transmission signal of each user that is sent from each APP decoder. MUD iteratively performs the processing above to increase the accuracy of signal estimation.

Japanese Patent Laying-Open No. 2007-60212 (PTD 1) discloses a configuration using a relay (relay device, repeater) that relays transmission data in uplink communication between a base station device and a portable terminal device.

NPD 5 below describes global standardization trends of cellular technology applied to machine communication.

CITATION LIST

Patent Document

PTD 1: Japanese Patent Laying-Open No. 2007-60212

Non Patent Document

NPD 1: Tominaga et al., Smart Grid from the Viewpoint of ICT [II], the Journal of Institute of Electronics, Information and Communication Engineers, Vol. 95, No. 1, 2012

NPD 2: Shao-Yu Lien et al., Toward Ubiquitous Massive Accesses in 3GPP Machine-to-Machine Communications, IEEE Communications Magazine, April 2011

NPD 3: Matsumoto et al., Performance Evaluation of IDMA for Small Packet Transmission, the Institute of Electronics, Information and Communication Engineers, Technical Report, RCS2011-342, March 2011

NPD 4: Li Ping et al., The OFDM-IDMA Approach to Wireless Communication Systems, IEEE Wireless Communications, June 2007

NPD 5: Ikeda et al., Standardization Activity on Cellular-Based Machine-to-Machine Communication, Panasonic Technical Journal Vol. 57, No. 1, April 2011

SUMMARY OF INVENTION

Technical Problem

However, the MTC management method of NPD 2 requires that individual MTC devices should make connection requests. This MTC management method therefore is unable to reduce control signals in relation with the connection requests. In the MTC management method, connection is denied if the system does not satisfy the permissible value of an MTC device. This MTC management method hence cannot satisfy the need for connecting a large number of MTC devices.

The method of NPD 3 eliminates the procedure for access requests. The base station device therefore does not know which MTC device transmits. Therefore, in the actual situation, the base station device has to perform the reception processing on the assumption of signals from MTC devices that do not transmit data. Specifically, in order to perform the reception processing for a signal actually not transmitted, the base station device has to generate a variable value for computation processing, in consideration of the component of a signal actually not transmitted. An error is then produced in an earlier stage of the iterative processing of MUD. As described above, in MUD of the base station device, unnecessary computation occurs and the reception performance may be degraded.

The present invention is made in view of the problems described above and aims to provide a wireless communication system in which a plurality of communication devices (MTC devices) performing machine communication can efficiently connect to a base station device, a base station device included in the wireless communication system, a communication device, a communication control method in the wireless communication system, the base station device and the communication devices, and a program for controlling the base station device and the communication devices.

Solution to Problem (1) According to an aspect of the present invention, a wireless communication system includes a plurality of communication devices each performing machine communication and a base station device performing wireless communication with the plurality of communication devices. Of the plurality of communication devices, each of communication devices in a first group that transmits data to the base station device using a first application data format is allocated first radio resource common in the first group. Each of the communication devices in the first group includes a first transmission unit for transmitting, to the base station device, a request signal for requesting access to the base station device, using the first radio resource. The base station device includes a first reception unit for receiving the request signal from each of the communication devices in the first group, an allocation unit for allocating second radio resource common in the first group to each of the communication devices that has transmitted the request signal, and a second transmission unit for transmitting first control information including allocation information indicating allocation of the second radio resource, to each of the communication devices that has transmitted the request signal. Each of the communication devices in the first group further includes a second reception unit for receiving the first control information from the base station device. The first transmission unit further transmits the data to the base station device using the second radio resource.

(2) Preferably, the wireless communication system according to the item (1) further includes a control device that controls the plurality of communication devices through the base station device. A common group identifier is set for each of the communication devices in the first group. The base station device or the control device allocates the first radio resource common in the first group to each of the communication devices having the group identifier.

(3) Preferably, in the wireless communication system according to the item (1) or (2), the first control information further includes a plurality of device identifiers for identifying communication devices.

(4) Preferably, in the wireless communication system according to any one of the items (1) to (3), the first control information includes a common signal format used by each of the communication devices in the first group.

(5) Preferably, in the wireless communication system according to any one of the items (1) to (4), the data transmitted by each of the communication devices in the first group is data based on an interleave division multiple access system that is generated with an interleave pattern different for each communication device.

(6) Preferably, in the wireless communication system according to any one of the items (1) to (5), in the first application data format, a block size of data is defined at a predetermined value.

(7) Preferably, the wireless communication system according to any one of the items (1) to (6) further includes a relay device connected to the plurality of communication devices and the base station. The first transmission unit transmits data to the base station device through the relay device, using the second radio resource.

(8) Preferably, in the wireless communication system according to any one of the items (1) to (7), of the plurality of communication devices, each of the communication devices in the second group that transmits data to the base station device using a second application data format is allocated third radio resource common in the second group. Each of second communication devices in the second group includes a third transmission unit for transmitting, to the base station device, a request signal for requesting access to the base station device, using the third radio resource. The first reception unit further receives the request signal from each of the communication devices in the second group. The allocation unit allocates fourth radio resource common in the second group, to each of the communication devices in the second group that has transmitted the request signal. The second transmission unit further transmits second control information including allocation information indicating allocation of the fourth radio resource, to each of the communication devices in the second group that has transmitted the request signal. Each of the second communication devices in the second group includes a third reception unit for receiving the second control information from the base station device. The third transmission unit further transmits the data to the base station device, using the fourth radio resource.

(9) Preferably, in the wireless communication system according to any one of the items (1) to (8), each of the communication devices in the first group has a predetermined first function. Each of the communication devices in the second group has a predetermined second function.

(10) According to another aspect of the present invention, a base station device communicates with a plurality of communication devices each performing machine communication. Of the plurality of communication devices, each of communication devices in a first group that transmits data to the base station device using a first application data format is allocated first radio resource common in the first group. The base station device includes a reception unit for receiving a request signal from each of the communication devices in the first group, an allocation unit for allocating second radio resource common in the first group to each of the communication devices that has transmitted the request signal, and a transmission unit for transmitting first control information including allocation of the second radio resource, to each of the communication devices that has transmitted the request signal.

(11) Preferably, of the plurality of communication devices, each of communication devices in a second group that transmits data to the base station device using a second application data format is allocated third radio resource common in the second group. The reception unit further receives the request signal from each of the communication devices in the second group. The allocation unit allocates fourth radio resource common in the second group, to each of the communication devices in the second group that has transmitted the request signal. The transmission unit further transmits second control information including allocation of the fourth radio resource, to each of the communication devices in the second group that has transmitted the request signal.

(12) According to a further aspect of the present invention, a communication device performs machine communication. The communication device includes a transmission unit for transmitting, to a base station device, a request signal for requesting access to the base station device, using first radio resource common in a group that is allocated to the communication device and another communication device in the same group that transmits data to the base station device using an application data format identical with that of the communication device, and a reception unit for receiving, from the base station device, control information including allocation information indicating allocation of second radio resource common in the group that is allocated by the base station device based on transmission of the request signal. The transmission unit further transmits data to the base station device, using the second radio resource.

(13) According to yet another aspect of the present invention, a communication control method is performed in a wireless communication system including a plurality of communication devices each performing machine communication and a base station device performing wireless communication with the plurality of communication devices. Of the plurality of communication devices, each of communication devices in a first group that transmits data to the base station device using a first application data format is allocated first radio resource common in the first group. The communication control method includes the steps of: each of the communication devices in the first group transmitting, to the base station device, a request signal for requesting access to the base station device, using the first radio resource; the base station device receiving the request signal from each of the communication devices in the first group; the base station device allocating second radio resource common in the first group to each of the communication devices that has transmitted the request signal; the base station device transmitting first control information including allocation information indicating allocation of the second radio resource, to each of the communication devices that has transmitted the request signal; each of the communication devices in the first group receiving the first control information from the base station device; and each of the communication devices in the first group further transmitting the data to the base station device, using the second radio resource.

(14) According to a still further aspect of the present invention, a communication control method is performed in a base station device communicating with a plurality of communication devices each performing machine communication. Of the plurality of communication devices, each of communication devices in a first group that transmits data to the base station device using a predetermined application data format is allocated first radio resource common in the first group. The communication control method includes the steps of: receiving a request signal from each of the communication devices in the first group; allocating second radio resource common in the first group to each of the communication devices that has transmitted the request signal; and transmitting first control information including allocation of the second radio resource, to each of the communication devices that has transmitted the request signal.

(15) According to another aspect of the present invention, a communication control method is performed in a communication device performing machine communication. The communication control method includes the steps of: transmitting, to a base station device, a request signal for requesting access to the base station device, using first radio resource common in a group that is allocated to the communication device and another communication device in the same group that transmits data to the base station device using an application data format identical with that of the communication device; receiving, from the base station device, control information including allocation information indicating allocation of second radio resource common in the group that is allocated by the base station device based on transmission of the request signal; and further transmitting data to the base station device, using the second radio resource.

(16) According to a further aspect of the present invention, a program controls a base station device communicating with a plurality of communication devices each performing machine communication and a mobility management entity. Of the plurality of communication devices, each of communication devices in a first group that transmits data to the base station device using a predetermined application data format is allocated first radio resource common in the first group. The program allows a processor of the base station device to execute the steps of: receiving a request signal from each of the communication devices in the first group; allocating second radio resource common in the first group to each of the communication devices that has transmitted the request signal; and transmitting first control information including allocation of the second radio resource, to each of the communication devices that has transmitted the request signal.

(17) According to a still further aspect of the present invention, a program controls a communication device performing machine communication. The program allows a processor of the communication device to execute the steps of: transmitting, to a base station device, a request signal for requesting access to the base station device, using first radio resource common in a group that is allocated to the communication device and another communication device in the same group that transmits data to the base station device using an application data format identical with that of the communication device; receiving, from the base station device, control information including allocation information indicating allocation of second radio resource common in the group that is allocated by the base station device based on transmission of the request signal; and further transmitting data to the base station device, using the second radio resource.

(18) Preferably, each of the communication devices in the first group stores a first group identifier common to each of the communication devices in the first group. Each of the communication devices in the second group stores a second group identifier common to each of the communication devices in the second group. The base station device transmits predetermined notification information in order to allocate the first radio resource to each of the communication devices in the first group and to allocate the third radio resource to each of the communication devices in the second group. The notification information includes information of a first start time to start an access request to the base station, information of a first end time to terminate the access request, and information representing a first period in which the access request is accepted, in relation with the first group identifier, and information of a second start time to start an access request to the base station, information of a second end time to terminate the access request, and information representing a second period in which the access request is accepted, in relation with the second group identifier.

(19) Preferably, each of the communication devices in the first group transmits the request signal in accordance with the first start time, the first end time, and the first period related with the first group identifier. Each of the communication devices in the second group transmits the request signal in accordance with the second start time, the second end time, and the second period related with the second group identifier.

Advantageous Effects of Invention

According to the present invention, a number of communication devices that perform machine communication can connect to a base station device efficiently.

BRIEF DESCRIPTION OF DRAWINGS

FIG. 4 is a diagram illustrating grouping of MTC devices.
FIG. 8 is a diagram illustrating a format of resource allocation information in a case where different MCSs and TFs are allocated to the subdivided groups.
FIG. 10 is a diagram illustrating a data format of an application used in MTC devices in group A.
FIG. 11 is a diagram illustrating a data format of an application used in MTC devices in group B.
FIG. 21 is a diagram illustrating classification in LTE.
FIG. 24 is a diagram illustrating grouping of MTC devices.
FIG. 28 is a diagram illustrating a transmission period for information about the access request acceptance segment and the arrangement of information about the access request acceptance segment.
FIG. 29 is a diagram illustrating an example of a data table used for grouping.

DESCRIPTION OF EMBODIMENTS

A communication system according to embodiments of the present invention will be described below with reference to the figures. In the following description, the same parts are denoted with the same reference signs. The designations and functions thereof are also the same. A detailed description thereof is not repeated.

First Embodiment

A. System Configuration

Figure 1:
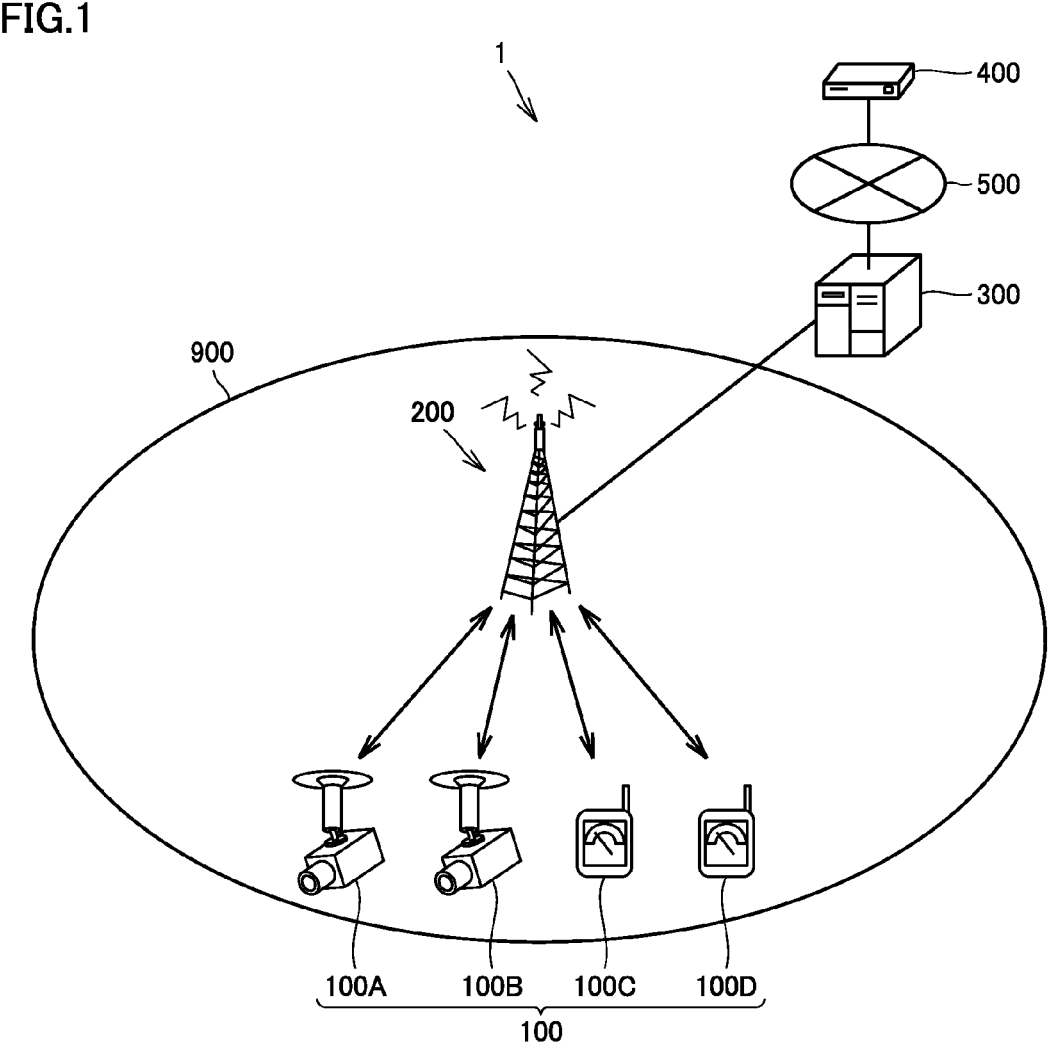
FIG. 1 is a diagram illustrating a schematic configuration of a wireless communication system.

FIG. 1 is a diagram illustrating a schematic configuration of a wireless communication system 1. Referring to FIG. 1, wireless communication system 1 includes a plurality of MTC devices 100A to 100D, a base station device (eNB: evolved Node B) 200, an MME (Mobile Management Entity) 300, and a server device 400.

The base station device 200 forms a cell 900. MTC devices 100A to 100D reside in cell 900 in which they can communication with base station device 200. Base station device 200 is connected to be able to communicate with MME 300. MME 300 is connected to be able to communicate with server device 400 through a network (a mobile communication network and/or the Internet) 500.

MTC devices 100A to 100D are communication devices that perform machine communication. Here, the "communication device that performs machine communication" means a communication device that automatically transmits or receives data in a predetermined format (or type).

MTC devices 100A, 100B are monitoring cameras. MTC devices 100C, 100D are electric meters (smart meters (registered trademark)). MTC devices 100A to 100D each have a communication function. MTC devices 100A to 100D each communicate with base station device 200. Data (image data or measurement data) transmitted from MTC devices 100A to 100D is transmitted to server device 400 through base station device 200 and MME 300.

MME 300 mainly executes mobility management of mobile station devices (UE: User Equipment), session management, non-access layer signaling and security, alarm message transmission, and selection of a base station device matched with an alarm message. According to an aspect, MME 300 controls the mobile station devices through base station device 200, as described above.

In the following description, a single MTC device is referred to as "MTC device 100" without differentiating MTC devices 100A to 100D, for convenience of explanation.

B. Process Overview

An overview of the process performed in wireless communication system 1 will be described below.

In wireless communication system 1, MTC devices 100A to 100D are grouped such that at least the block size of data transmitted by each MTC device 100A to 100D is common That is, they are grouped according to the difference in application data format (for example, FIGS. 10 and 11) in which data is transmitted to base station device 200. Wireless communication system 1 is configured such that the traffic distribution of MTC devices is common in the same group.

In the following, it is assumed that MTC devices 100A, 100B having a common function are classified into a group A (first group), and MTC devices 100C, 100D having a common function are classified into a group B (second group). Which MTC device belongs to which group is specified by a group ID described later (FIG. 4).

Base station device 200 or MME 300 sets an access request acceptance segment for each of a plurality of groups (group A, group B). For example, base station device 200 or MME 300 sets an access request acceptance segment PA for group A and sets an access request acceptance segment PB for group B. Wireless communication system 1 may be configured such that an entity (not shown) other than base station device 200 and MME 300 sets an access request acceptance segment.

The access request acceptance segment refers to radio resource that can be used in the uplink of wireless communication system 1. Specifically, the access request acceptance segment is configured with a plurality of successive resource blocks. For example, base station device 200 or MME 300 allocates radio resource RAα common in group A to each of MTC devices 100A, 100B in group A and allocates radio resource RBβ common in group B to each of MTC devices 100C, 100D in group B. The details of the access request acceptance segment will be described later.

Each MTC device 100 transmits an access request signal in a predetermined signal format to base station device 200 in the access request acceptance segment set for each group. Base station device 200 transmits an access enable signal corresponding to the access request signal collectively to MTC devices 100. Specifically, base station device 200 allocates radio resource RAβ common in group A to each of MTC devices 100A, 100B in group A and allocates radio resource RBβ common in group B to each of MTC devices 100C, 100D in group B. Base station device 200 transmits an access enable signal (control information C1) including resource allocation information indicating the allocation of radio resource RAβ to each of MTC devices 100A, 100B in group A, and transmits an access enable signal (control information C2) including resource allocation information indicating the allocation of radio resource RBβ to each of MTC devices 100C, 100D in group B.

Each MTC device 100 transmits data to base station device 200 using a predetermined signal format, in accordance with the resource allocation information included in the access enable signal. Specifically, MTC devices 100A, 100B in group A transmit data to base station device 200 using radio resource RAβ. MTC devices 100C, 100D in group B transmits data to base station device 200 using radio resource RBβ.

Base station device 200 simultaneously receives data from a plurality of MTC devices 100, using the multi user detection (MUD) technique.

As described above, in wireless communication system 1, a plurality of MTC devices 100 are grouped so that access request, resource allocation, and data transmission are collectively performed, thereby efficiently connecting many MTC devices 100 to the network (base station device 200, MME 300, server device 400).

A configuration in which base station device 200 sets an access request acceptance segment for each of a plurality of groups will be described below, by way of example, for convenience of explanation.

C. Hardware Configuration (c1. MTC Device 100)

Figure 2:
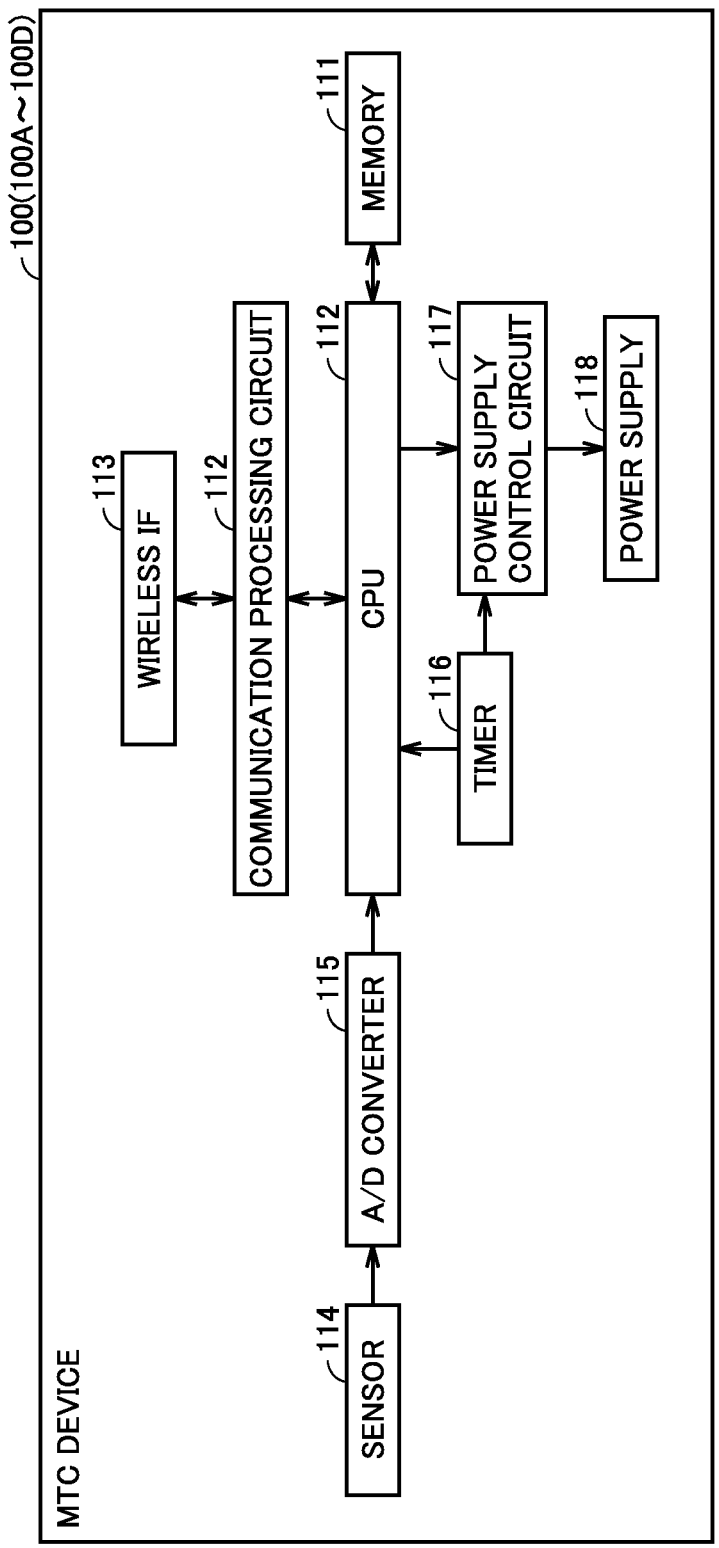
FIG. 2 is a diagram illustrating an overview of a hardware configuration of an MTC device.

FIG. 2 is a diagram illustrating an overview of a hardware configuration of MTC device 100. Referring to FIG. 2, MTC device 100 includes a CPU (Central Processing Unit) 110, a memory 111, a communication processing circuit 112, a wireless IF 113, a sensor 114, an A/D (Analog to Digital) converter 115, a timer 116, a power supply control circuit 117, and a power supply 118.

When a start instruction signal is input from power supply control circuit 117, CPU 110 reads out a program stored in memory 111. CPU 110 runs the read program to control the entire operation of MTC device 100. CPU 110 reads out an equipment identifier (device ID) and an MTC group identifier (group ID) stored in advance from memory 111. CPU 110 extracts information corresponding to the access request acceptance segment corresponding to the group ID from the received information from base station device 200 that is input from communication processing circuit 112. CPU 110 stores the extracted information corresponding to the access request acceptance segment into memory 111. CPU 110 generates schedule information corresponding to the access request acceptance segment and sets the same in power supply control circuit 117.

CPU 110 temporarily stores digital data input from A/D converter 115 into memory 111. CPU 110 generates an access request signal corresponding to the access request acceptance segment. CPU 110 outputs the generated access request signal, as a signal to be transmitted to base station device 200, to communication processing circuit 112. CPU 110 generates a signal for transmitting the digital data temporarily stored in memory 111 to base station device 200, in response to the access enable signal from the base station that is input from communication processing circuit 112. CPU 110 outputs the generated signal to communication processing circuit 112. When a stop instruction signal is input from power supply control circuit 117, CPU 110 stops the operation of the running program thereby to stop the operation of units other than timer 116 and power supply control circuit 117.

Communication processing circuit 112 processes a signal in a base frequency band input from wireless IF 113 (received signal) to generate an information signal sequence or a control information sequence. Communication processing circuit 112 outputs the generated sequence to CPU 110. Communication processing circuit 112 outputs the signal input from CPU 110, as a signal in a base frequency band to be transmitted to base station device 200, to wireless IF 113.

Wireless IF 113 down-converts the signal received via radio waves from base station device 200 to generate a signal in a base frequency band. Wireless IF 113 outputs the generated signal in a base frequency band to communication processing circuit 112. Wireless IF 113 up-converts the signal in a base frequency band input from communication processing circuit 112 to generate a signal in a radio frequency band. Wireless IF 113 outputs the generated signal in a radio frequency region, with power amplified, to base station device 200 via radio waves.

Sensor 114 senses analog data representing the surrounding environment of MTC device 100. Sensor 114 is, for example, a camera capturing an image or an electric power sensor including a voltmeter and an ammeter for measuring electric power. Sensor 114 outputs the sensed analog data to A/D converter 115.

A/D converter 115 performs A/D conversion of the analog data input from sensor 114 to generate digital data. A/D converter 115 outputs the generated digital data to CPU 110.

Timer 116 sequentially measures the present time and outputs the measured time information to CPU 110 and power supply control circuit 117.

In power supply control circuit 117, scheduling information is preset, which represents information about the start time to start power supply 118 and the stop time to stop power supply 118. It is noted that "stop" means a state in which timer 116 and power supply control circuit 117 operate while the other functional units stop. Power supply control circuit 117 generates a start instruction to start when the time information input from timer 116 reaches the start time represented by the scheduling information corresponding to the time information. Power supply control circuit 117 generates a stop instruction signal to stop when the time information input from timer 116 reaches the stop time represented by the scheduling information corresponding to the time information. Power supply control circuit 117 outputs the generated start instruction signal or stop instruction signal to CPU 110 and power supply 118.

Power supply 118 supplies power to each unit in MTC device 100 when a start instruction signal is input from power supply control circuit 117. Power supply 118 stops supply of power supply 118 to each unit other than timer 116 and power supply control circuit 117 after a stop instruction signal is input from power supply control circuit 117 and the operation of CPU 110 stops.

The processing in MTC device 100 is implemented by hardware and software executed by CPU 110. Such software may be stored in memory 111 in advance. The software may be stored in memory cards or other storage media and distributed as program products. Otherwise, the software may be provided as downloadable program products by an information provider connected to the Internet. Such software is read out from the storage medium by an IC card reader/writer or other reading devices or downloaded via wireless IF 113 and then temporarily stored into memory 111. The software is read out from memory 111 by CPU 110 and stored in the form of an executable program into memory 111. CPU 110 executes the program.

Each component included in MTC device 100 shown in the figure is the general one. It can be said that the essential part of the present invention is the software stored in memory 111, a memory card, or other storage media or software downloadable via a network.

The recording medium is not limited to a DVD-ROM, a CD-ROM, an FD, and a hard disk but may be a medium that fixedly carries the program, such as a magnetic tape, a cassette tape, an optical disk, an optical card, and a semiconductor memory such as a mask ROM, an EPROM, an EEPROM, and a flash ROM. The recording medium is a non-transitory medium having the program or other data readable by a computer. The program referred to here includes not only a program directly executable by a CPU but also a program in a source program format, a compressed program, and an encrypted program.

(c2. Base Station Device 200)

Figure 3:
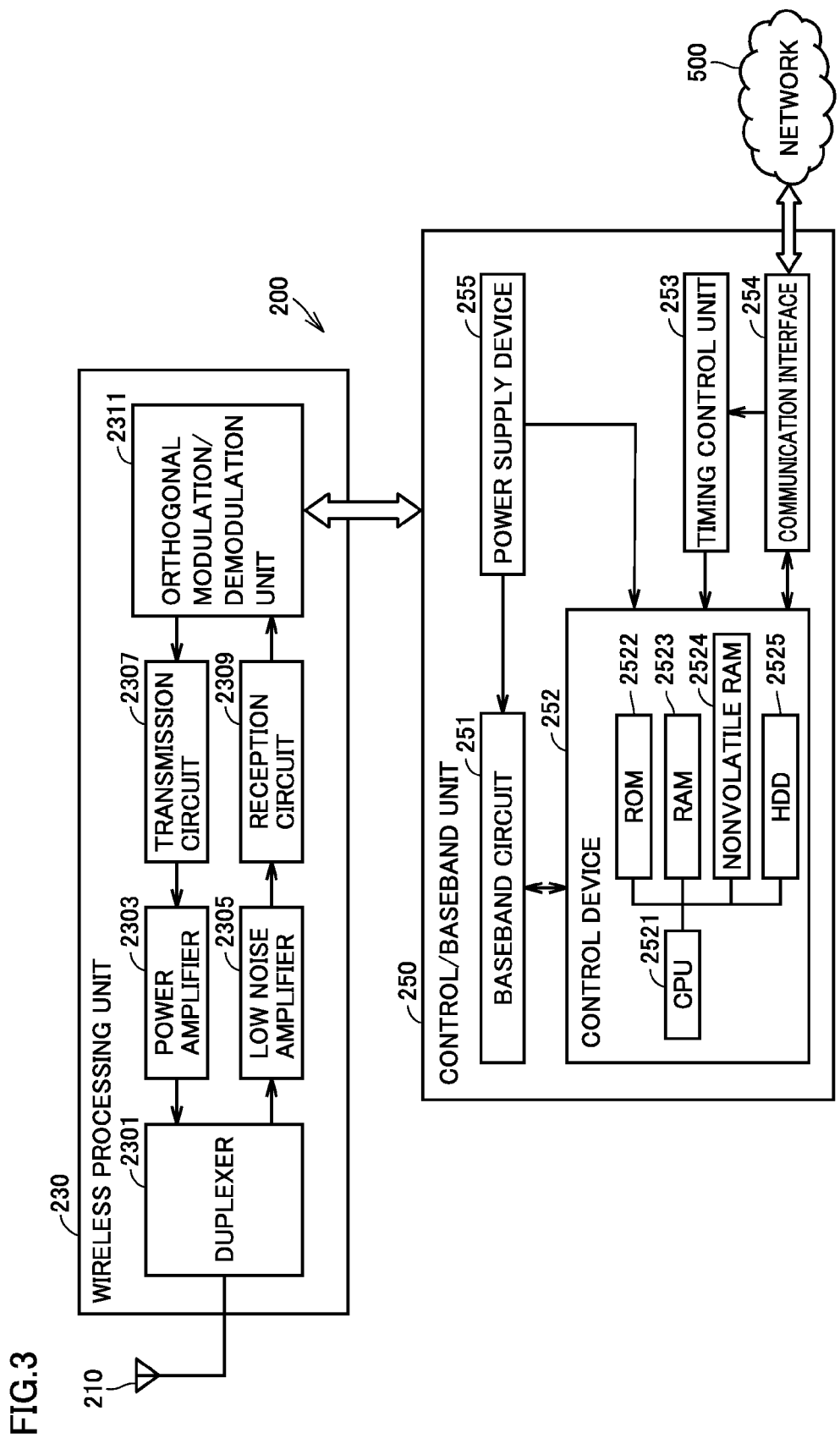
FIG. 3 is a diagram illustrating a typical hardware configuration of a base station device.

FIG. 3 is a diagram illustrating a typical hardware configuration of base station device 200. Referring to FIG. 3, base station device 200 includes an antenna 210, a wireless processing unit 230, and a control/baseband unit 250.

Radio processing unit 230 includes a duplexer 2301, a power amplifier 2303, a low noise amplifier 2305, a transmission circuit 2307, a reception circuit 2309, and an orthogonal modulation/demodulation unit 2311. Control/baseband unit 250 includes a baseband circuit 251, a control device 252, a power supply device 255, a timing control unit 253, and a communication interface 254. Control device 252 includes a CPU 2521, a ROM 2522, a RAM 2523, a nonvolatile memory 2524, and an HDD (Hard Disk Drive) 2525.

Orthogonal modulation/demodulation unit 2311 orthogonally modulates/demodulates an OFDM (Orthogonal Frequency Division Multiplexing) signal processed by baseband circuit 251 for conversion into an analog signal (RF (Radio Frequency) signal). Transmission circuit 2307 converts the RF signal generated by orthogonal modulation/demodulation unit 2311 into a frequency to be sent as a radio wave. Reception circuit 2309 converts the received radio wave into a frequency to be processed by orthogonal modulation/demodulation unit 2311.

Power amplifier 2303 amplifies power of the RF signal generated by transmission circuit 2307 for transmission from antenna 210. Low noise amplifier 2305 amplifies a weak radio wave received by antenna 210 and passes the amplified radio wave to reception circuit 2309.

Control device 252 performs control of the entire base station device 200 and protocol or control monitoring for call control. Timing control unit 253 generates a variety of clocks for use in the inside of base station device 200, based on a reference clock extracted from, for example, a transmission path.

Communication interface 254 connects a transmission path such as Ethernet (registered trademark) and processes a protocol such as IPsec (Security Architecture for Internet Protocol) and IPv6 (Internet Protocol Version 6) to exchange IP packets.

Baseband circuit 251 performs conversion (modulation/demodulation) of an IP packet exchanged using communication interface 254 and an OFDM signal (baseband signal) carried on a radio wave. The baseband signal is exchanged with wireless processing unit 230.

Power supply device 255 converts the voltage supplied to base station device 200 into a voltage used in the inside of base station device 200.

The processing in base station device 200 is implemented by hardware and software executed by CPU 2521. Such software may be stored in, for example, HDD 2525 in advance. The software may be stored in memory cards (not shown) or other storage media and distributed as program products. Otherwise, the software may be provided as downloadable program products by an information provider connected to the Internet. Such software is read out from the storage medium by an IC card reader/writer or other reading devices or downloaded via communication interface 254 and then temporarily stored into HDD 2525. The software is read out from HDD 2525 by CPU 2521 and then stored in the form of an executable program into nonvolatile memory 2524. CPU 2521 executes the program.

Each component included in base station device 200 shown in the figure is the general one. It can be said that the essential part of the present invention is the software stored in HDD 2525, nonvolatile memory 2524, a memory card, or other storage medium or software downloadable via a network. The operation of the hardware of base station device 200 is well known and a detailed description thereof is not repeated.

The recording medium is not limited to a DVD-ROM, a CD-ROM, an FD (Flexible Disk), and a hard disk but may be a medium that fixedly carries the program, such as a magnetic tape, a cassette tape, an optical disk (MO (Magnetic Optical Disc)/MD (Mini Disc)/DVD (Digital Versatile Disc)), an optical card, and a semiconductor memory such as a mask ROM, an EPROM (Electronically Programmable Read-Only Memory), an EEPROM (Electronically Erasable Programmable Read-Only Memory), and a flash ROM. The recording medium is a computer-readable non-transitory medium. The program referred to here includes not only a program directly executable by a CPU but also a program in a source program format, a compressed program, and an encrypted program.

D. Details of Processing

The details of the processing performed in wireless communication system 1 will now be described.

FIG. 4 is a diagram illustrating grouping of MTC devices 100. As described above, MTC devices having a common function (characteristic) are classified into the same group.

Referring to FIG. 4, in a data table 4, service fields, applications, and service providers are associated with group IDs representing groups. Data table 4 is stored in base station device 200 or MME 300. Examples of the service fields include security, medical care, and measurement fields. Examples of the applications include applications used in the fields of building maintenance, automobiles, human body status measurement (heart rate, body temperature, blood pressure, etc.), elderly supports, electric power, gas, water, and the like.

For example, in the application for building maintenance with a monitoring camera having a group ID "0001" (corresponding to group A), video of the monitoring camera (MTC devices 100A, 100B) is successively transmitted at 300 kbps. For example, MTC devices 100A and 100B are monitoring cameras of Company A. MTC devices 100A, 100B transmit a data block of 300 kbit once a second to base station device 200 in order to enhance the communication efficiency while permitting a delay.

In the application of power consumption measurement with an electric meter having a group ID "0009" (corresponding to group B), the electric meter (MTC devices 100C, 100D) transmits a data block of 32 bits once an hour. For example, MTC device 100C and MTC device 100D are monitoring cameras of Company I.

Each MTC device 100 receives allocation of a group ID from MME 300 through position registration processing. The communication for the position registration processing is not bound to the access request acceptance segment below. Alternatively, an ID set in advance in a memory (for example, a ROM (Read Only Memory) or a USIM (Universal Subscriber Identification Module)) may be used as a group ID.

Base station device 200 sets an access request acceptance segment for each group. Base station device 200 announces the set access request acceptance segment as notification information to each MTC device 100. In doing so, terminal devices (MTC devices and non-MTC devices) in wireless communication system 1 may be configured such that MTC device 100 in each group receives only the information block including information representing the device's own group and a not-shown non-MTC device (a user terminal device other than an MTC device) does not receive the information. Alternatively, information representing the group may be announced to MTC device 100 during position registration.

Each MTC device 100 transmits an access request signal to base station device 200 in a format designated, for example, by the notification information, based on the group ID, in the access request acceptance segment allocated to the device's own group.

Base station device 200 determines which MTC device 100 has transmitted the access request signal, based on the received signal. By using a signal with high orthogonality as the access request signal, base station device 200 can receive access request signals simultaneously from a plurality of MTC devices 100.

Figure 5:
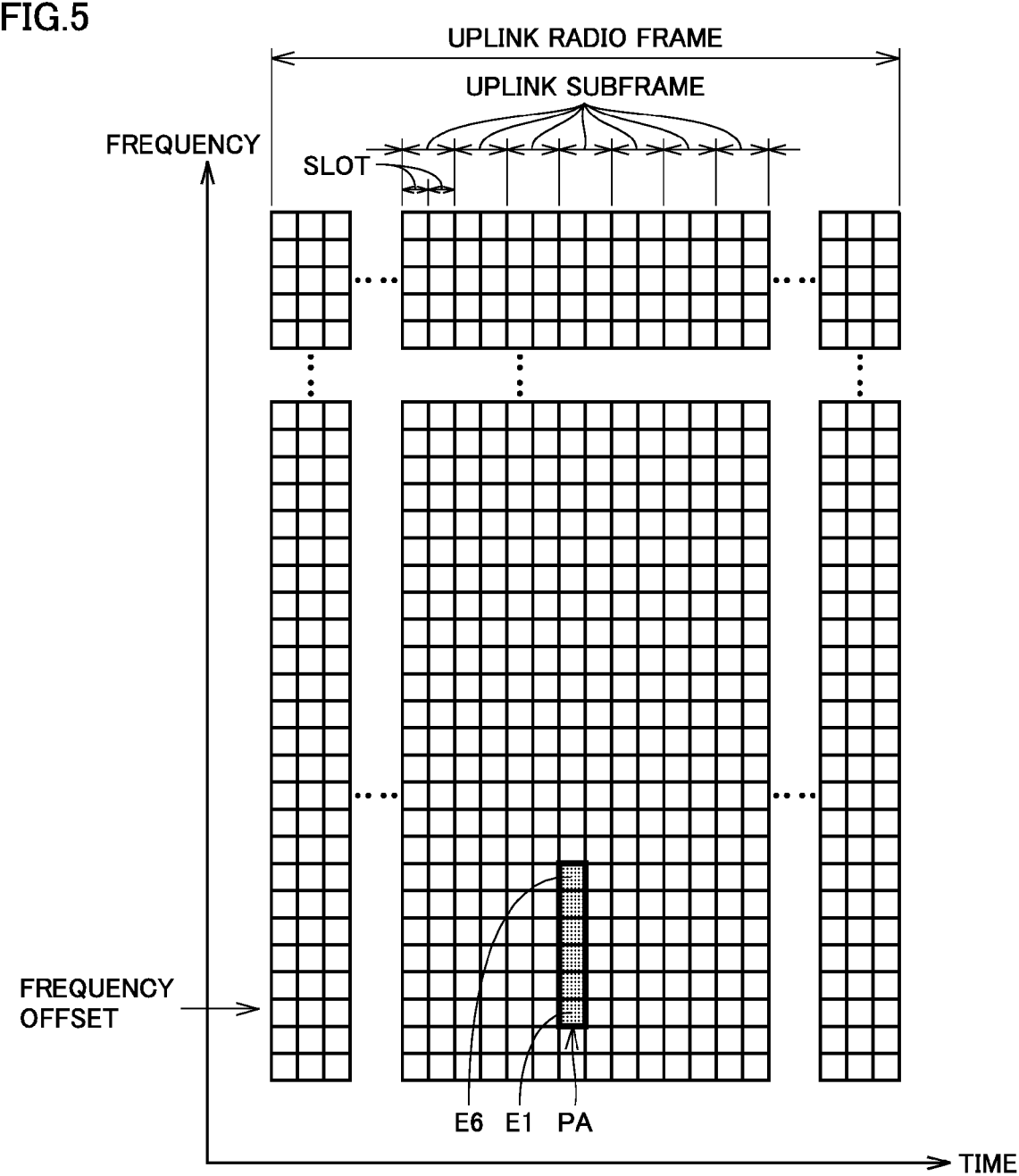
FIG. 5 is a diagram illustrating an example of an access request acceptance segment.

FIG. 5 is a diagram illustrating an example of the access request acceptance segment. Specifically, FIG. 5 illustrates access request acceptance segment PA allocated to group A. Referring to FIG. 5, MTC devices 100A, 100B in group A transmits an access request to base station device 200 in the allocated access request acceptance segment PA. Access request acceptance segment PA is configured with six resource blocks in succession in the frequency direction, in a predetermined subframe (uplink subframe) in one frame. Specifically, access request acceptance segment PA is a segment defined by a resource block E1 and a resource block E6.

In LTE, each of a plurality of uplink subframes is configured with two slots (uplink slots) adjacent in the time axis direction. Each slot includes a plurality of resource blocks in the frequency axis direction. Each resource block is configured with a region of 180 kHz×0.5 msec. Each resource block is configured with a plurality of resource elements (12 in the frequency axis direction and seven in the time axis direction, in total, 84 resource elements).

In this manner, MTC devices 100A, 100B in group A each transmit data to base station device 200, using six resource blocks (radio resource) in succession in the frequency direction, in a predetermined subframe (uplink subframe) in one frame.

MTC devices 100A, 100B determine access request acceptance segment PA, based on the number of the frame, the number of the uplink subframe, and the frequency offset corresponding to group A. Since the number of the frame is repeated every 10 seconds, another parameter is necessary in order to increase the interval between segments. MTC devices 100A, 100B generate a sequence using a parameter provided by a root sequence index and performs shift processing corresponding to the device ID.

Base station device 200 receives access request signals transmitted from MTC devices 100. Base station device 200 confirms that the received access request signals are the access request signals from devices in the designated group. If the number of access request signals is equal to or smaller than a permissible number, base station device 200 transmits a control signal including resource allocation information (access enable, scheduling) to these MTC devices 100.

Figure 6:
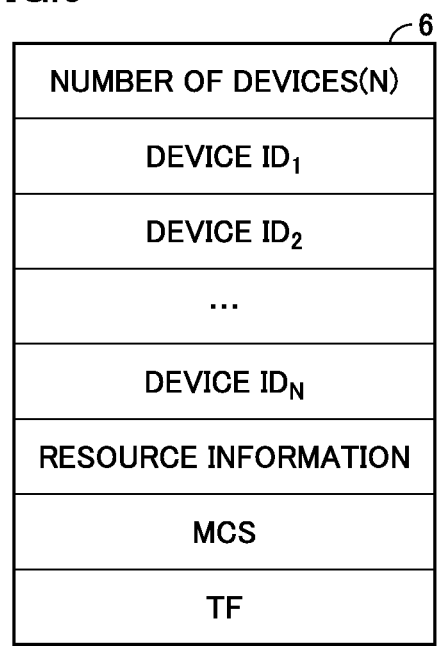
FIG. 6 is a diagram illustrating a format of resource allocation information included in an access enable signal.

FIG. 6 is a diagram illustrating a format of the resource allocation information included in the access enable signal (control information). Referring to FIG. 6, with a format 6 of the resource allocation information, allocation to a plurality of devices can be announced using single resource allocation information. The device number N represents the number of MTC devices 100 to which allocation is performed. The device ID ($ID_1$ to $ID_N$) indicates the ID of each MTC device 100. The resource information field includes information of the start position and the length of a resource block in the resource allocated. MCS (Modulation and Coding Scheme) indicates a combination of a modulation scheme and a code rate in transmission. TF (Transport Format) indicates a transmission format.

Figure 7:
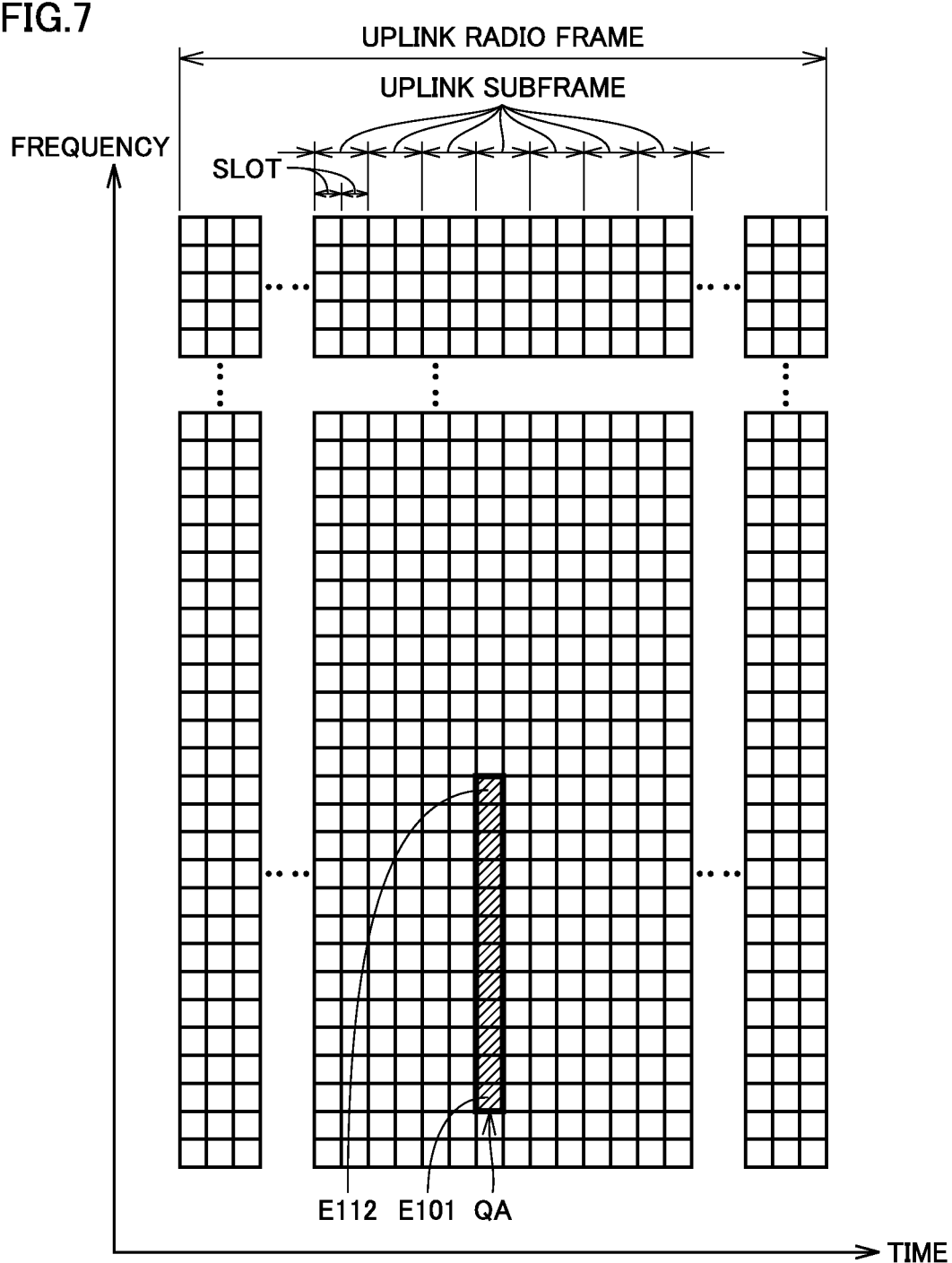
FIG. 7 is a diagram illustrating an example of the allocated resource.

FIG. 7 is a diagram illustrating an example of the allocated resource. Referring to FIG. 7, N MTC devices 100 designated by device IDs share the resource block indicated by the resource information field. N MTC devices to which common resource is allocated use a common MCS and a common TF. That is, N MTC devices 100 transmit data (for example, video data) to base station device 200 using a common MCS and a common TF in a segment QA.

For example, MTC devices 100A, 100B in group A transmit data to base station device 200 in the allocated segment QA. The segment QA is configured with 12 resource blocks in succession in the frequency direction, in a predetermined uplink subframe in one frame. For example, the segment QA is a segment defined by a resource block E101 and a resource block E112. In this case, MTC devices 100A, 100B in group A each transmit video data to base station device 200, using 12 resource blocks (radio resource) in succession in the frequency direction, in a predetermined uplink subframe in one frame.

As described above, each of MTC devices 100 belonging to the same group transmits video data in a common application data format to base station device 200, using common radio resource, a common MCS, and a common TF.

In FIG. 6, an example in which common MCS and TF are allocated to all MTC devices 100 in one group (for example, group A) has been described above. The embodiment, however, is not limited thereto. For example, one group may be subdivided into a plurality of groups according to the distance from base station device 200, and different MCSs and TFs may be allocated to the subdivided groups.

FIG. 8 is a diagram illustrating a format 8 of the resource allocation information in a case where different MCSs and TFs are allocated to the subdivided groups. Referring to FIG. 8, NA MTC devices 100 specified by device $ID_{A1}$ to $ID_{AN}$ in the format 8 transmit data to base station device 200, using a common MCSA and a common TFA, in the resource blocks designated by resource information VA. NB MTC devices 100 specified by device $ID_{B1}$ to $ID_{BN}$ transmit data to base station device 200 using a common $MCS_B$ and a common $TF_B$, in the resource blocks designated by resource information VB.

That is, some of MTC devices 100 among N MTC devices 100 transmit data (for example, video data) to base station device 200 using a common MCSA and a common TFA in a segment QB, while the other MTC devices 100 among N MTC devices 100 transmit data (for example, video data) to base station device 200 using a common $MCS_B$ and a common $TF_B$ in a segment QC.

Figure 9:
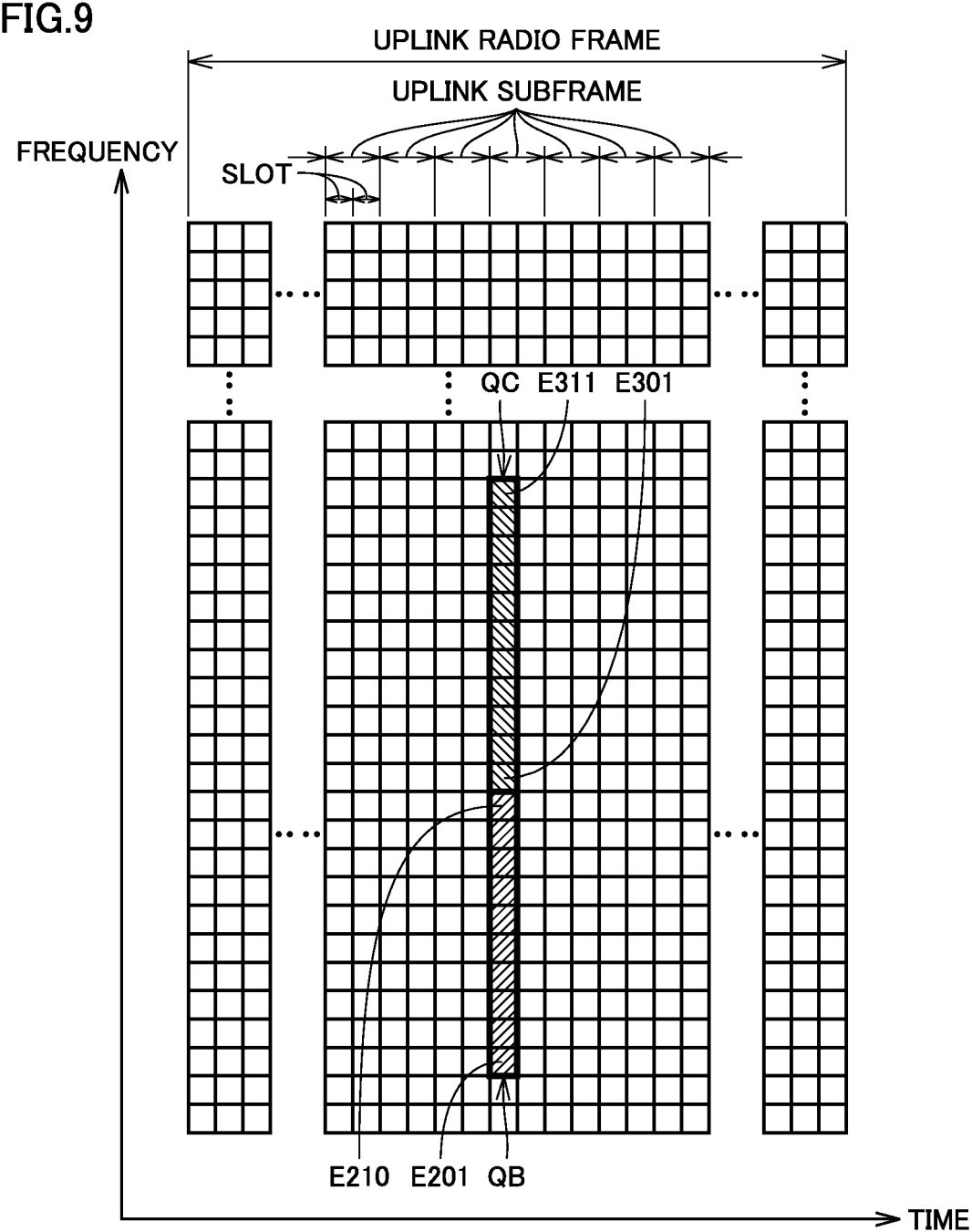
FIG. 9 is a diagram illustrating an example of the allocated resource in a case where different MCSs and TFs are allocated to the subdivided groups.

FIG. 9 is a diagram illustrating an example of the allocated resource in a case where different MCSs and TFs are allocated to the subdivided groups. Referring to FIG. 9, for example, MTC device 100A in group A transmits data to base station device 200 in the allocated segment QB. The segment QB is configured with 10 resource blocks in succession in the frequency direction, in a predetermined uplink subframe in one frame. Specifically, the segment QB is a segment defined by a resource block E201 and a resource block E210.

MTC device 100B in group A transmits data to base station device 200 in the allocated segment QC. The segment QC is configured with 11 resource blocks in succession in the frequency direction, in a predetermined uplink subframe in one frame. Specifically, the segment QC is a segment defined by a resource block E301 and a resource block E311. Resource block E301 is adjacent to resource block E210.

FIG. 10 is a diagram illustrating a data format of an application used in MTC devices 100A, 100B (monitoring cameras) in group A. Referring to FIG. 10, MTC devices 100A, 100B transmit the captured video data to server device 400 through base station device 200 and MME 300, using a data format 10 for transmitting moving data obtained by image capturing at 300 kbit.

FIG. 11 is a diagram illustrating a data format of an application used in MTC devices 100C, 100D (electric meters) in group B. Referring to FIG. 11, MTC devices 100C, 100D transmit power consumption data obtained through measurement to server device 400 through base station device 200 and MME 300, using a data format 11 for transmission at 16 bits.

The data transmitted from an MTC device may include, in addition to the application data shown in FIG. 10 and FIG. 11, information such as an IP header including the preset device's own IP address and the IP address of the destination MTC server, and a TCP or UDP header including a port number.

When base station device 200 simultaneously allocates transmission for a plurality of MTC devices 100 in the same group, the lengths of signals simultaneously transmitted from MTC devices 100 are standardized. Allocating transmission data of different data lengths to a common TF is inefficient because padding is required. However, in this case, signals having a standardized data length are associated with a common TF, thereby enabling efficient transmission. Each MTC device generates a signal for transmission, using the device ID uniquely allocated to MTC device 100.

In wireless communication system 1, since a plurality of MTC devices 100 use common radio resource, the signals may collide and interfere with each other. There are some possible methods by which base station device 200 extracts data transmitted from each MTC device 100 while suppressing interference of signals from other MTC devices 100. In wireless communication system 1, the IDMA system described above is used as a method for extracting data.

According to NPD 3 above in connection with the IDMA system, a common MCS alone is announced to all the terminals in a cell, without performing scheduling, whereas in wireless communication system 1, scheduling of MTC devices 100 is performed in response to access request signals. The control information required for scheduling, however, is significantly small compared with the conventional method in which scheduling is performed for MTC devices one by one, because the scheduling can be sent collectively to a plurality of MTC devices 100.

Figure 22:
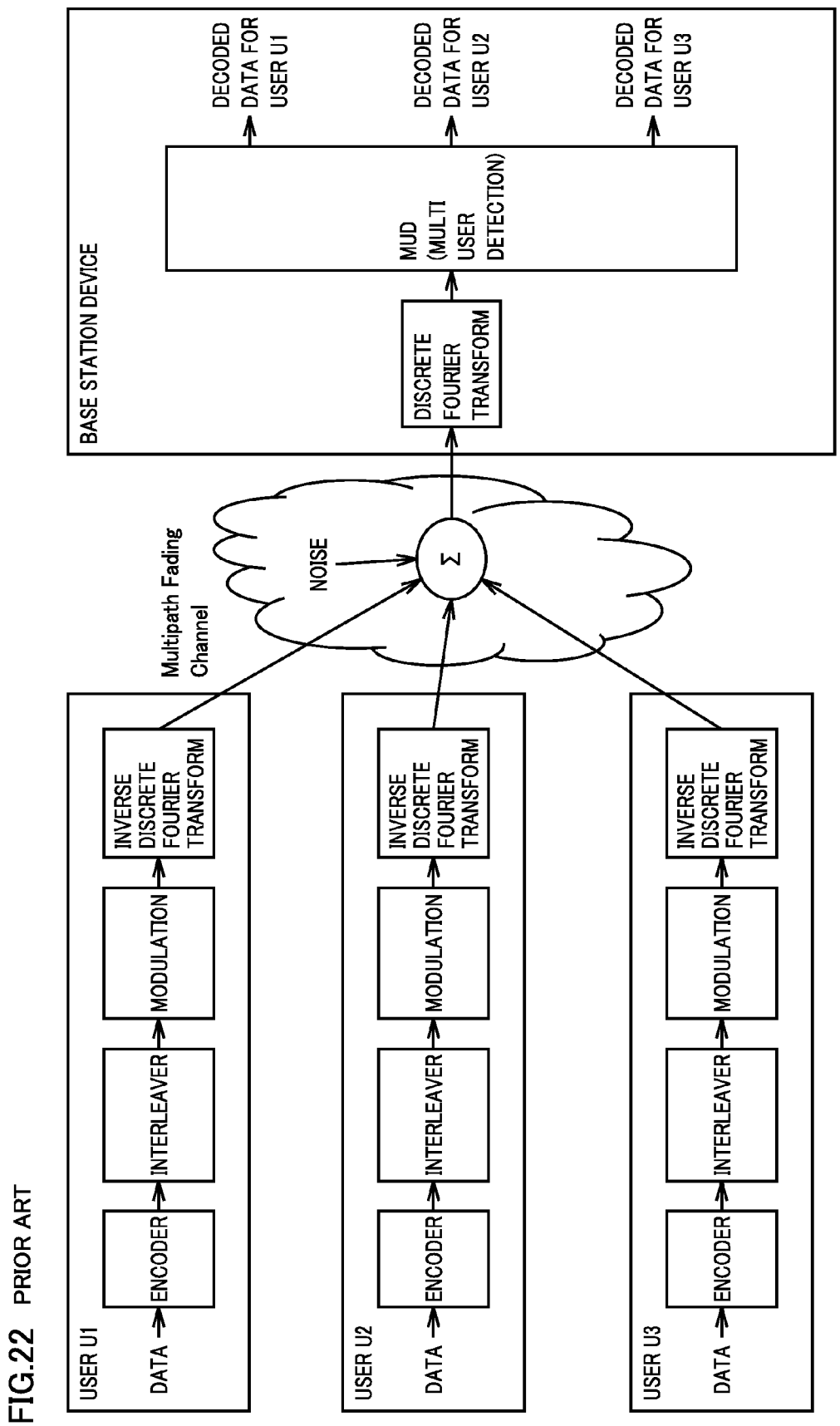
FIG. 22 is a diagram illustrating the principle of the OFDM-IDMA.
Figure 23:
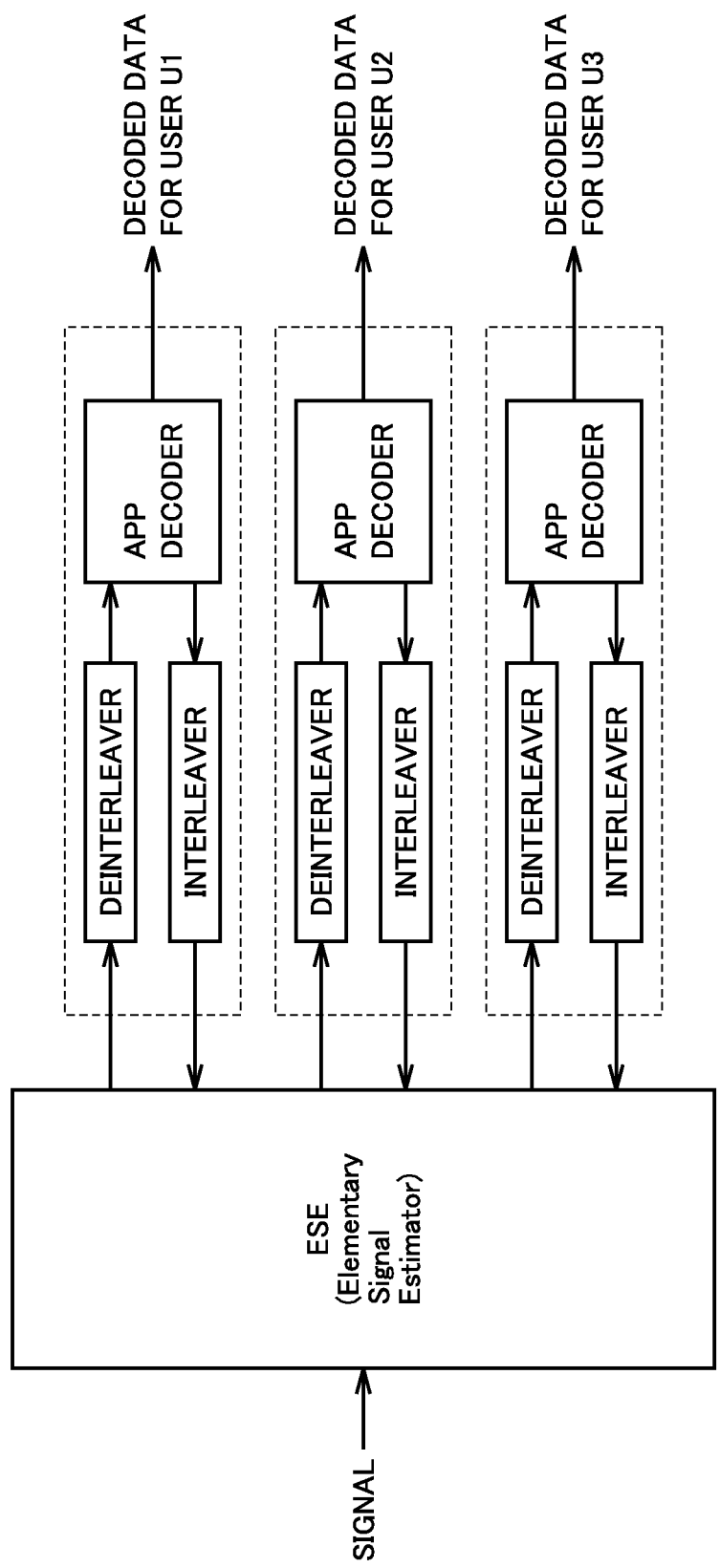
FIG. 23 is a diagram illustrating the operation of MUD.

For the processing of receiving and demodulating an IDMA signal, the method described in conjunction with FIG. 22 and FIG. 23 is used. A repeated description is not given here.

When the iterative processing by MUD as described above for enhancing the accuracy of signal estimation is performed, it is important that data of MTC devices 100 is transmitted using common MCS and TF. If MTC devices 100 transmit data to base station device 200 using different MCSs and/or different TFs, the MUD processing in base station device 200 varies among MTC devices 100, and the allocation of the processing becomes complicated. With the standardized MCS and TF, base station device 200 easily performs the iterative processing of decoding the signals sent from MTC devices 100, in parallel. That is, in a case where MCSs and TFs cannot be standardized, the length of the interleaver in FIG. 23, the processing volume of the decoder, and the storage capacity vary, and in addition, the processing delay also varies. With the standardized MCS and TF, a common configuration of the deinterleaver, the APP decoder, and the interleaver can be used, and it is only necessary to change interleave patterns. With the standardized MCS and TF, the processing delays become uniform and base station device 200 easily parallelize the decoding processing. Furthermore, with the standardized MCS and TF, base station device 200 no longer has to perform the processing such as quality measurement for determining the MCS and the TF, and notification of data volume.

E. Functional Configuration

Figure 12:
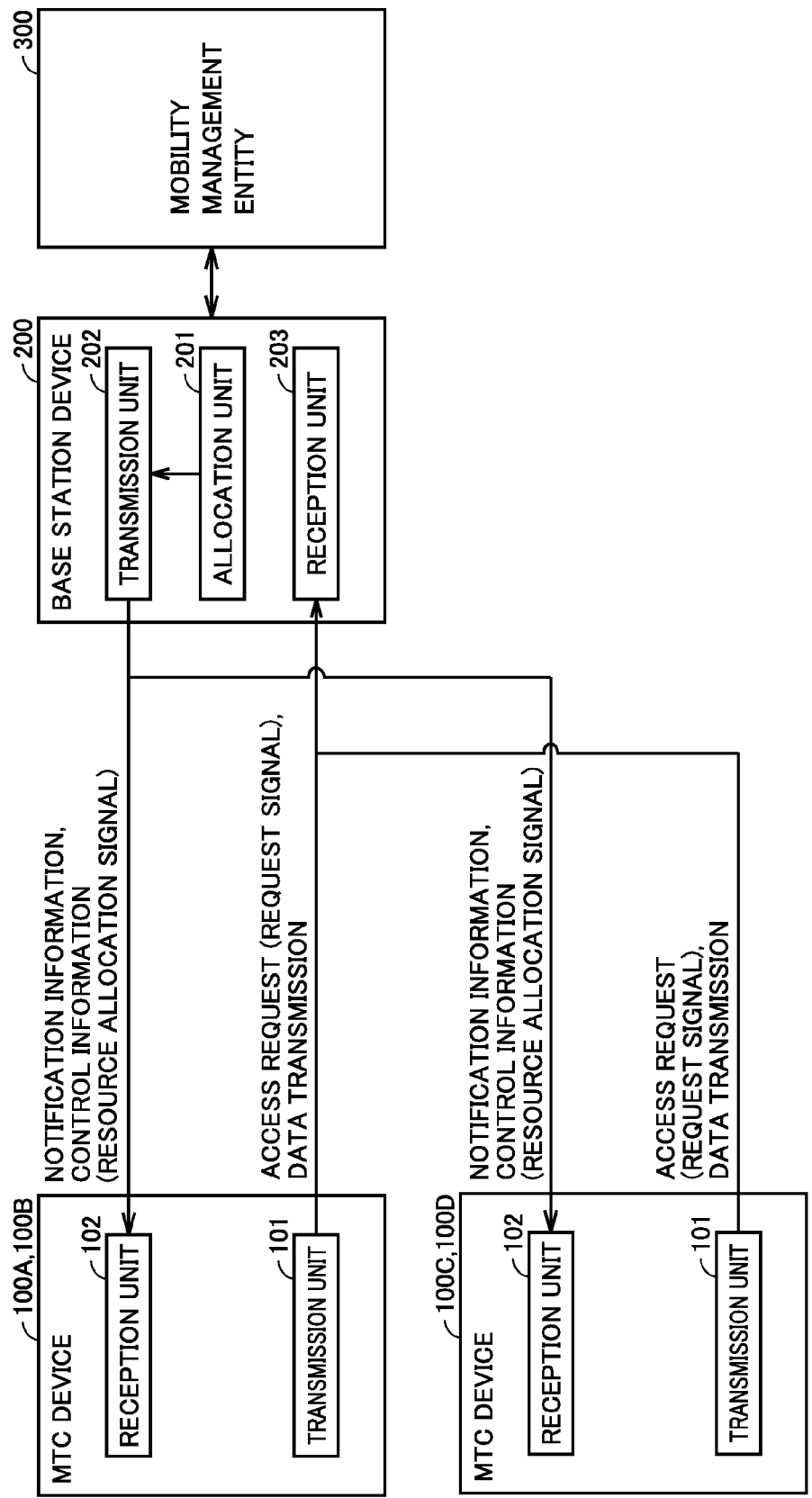
FIG. 12 is a diagram illustrating a functional configuration of the MTC device and a functional configuration of the base station device.

FIG. 12 is a diagram illustrating a functional configuration of MTC device 100 and a functional configuration of base station device 200. In FIG. 12, one MTC device 100 alone is illustrated for convenience of explanation. Referring to FIG. 12, MTC device 100 includes a transmission unit 101 and a reception unit 102. Base station device 200 includes an allocation unit 201, a transmission unit 202, and a reception unit 203.

(1) Allocation unit 201 of base station device 200 allocates radio resource RAα (first radio resource) common in group A, to each of MTC devices 100A, 100B in group A that transmits data to base station device 200 using a first application data format, among a plurality of MTC devices 100. Allocation unit 201 further allocates radio resource RBα (third radio resource) common in group B, to each of MTC devices 100C, 100D in group B that transmits data to base station device 200 using a second application data format, among a plurality of MTC devices 100.

Each transmission unit 101 in MTC devices 100A, 100B in group A transmits, to base station device 200, a request signal for requesting access to base station device 200, using radio resource RAα. Each transmission unit 101 in MTC devices 100C, 100D in group B transmits, to base station device 200, a request signal for requesting access to base station device 200, using radio resource RBα.

Reception unit 203 of base station device 200 receives a request signal from each of MTC devices 100A, 100B in group A. Reception unit 203 also receives a request signal from each of MTC devices 100C, 100D in group B.

Allocation unit 201 allocates radio resource RAβ (second radio resource) common in group A to each of MTC devices 100A, 100B that has transmitted a request signal. Allocation unit 201 further allocates radio resource RBβ (fourth radio resource) common in group B to each of MTC devices 100C, 100D that has transmitted a request signal.

Transmission unit 202 of base station device 200 transmits an access enable signal (control information C1) including allocation information indicating allocation of radio resource RAβ to each of MTC devices 100A, 100B communication devices that has transmitted a request signal. Transmission unit 202 also transmits an access enable signal (control information C2) including allocation information indicating allocation of radio resource RBβ to each of MTC devices 100C, 100D that has transmitted a request signal.

Each reception unit 102 of MTC devices 100A, 100B in group A receives the access enable signal (control information C1) including allocation information indicating allocation of radio resource RAβ from base station device 200. On the other hand, each reception unit 102 of MTC devices 100C, 100D in group B receives the access enable signal (control information C2) including allocation information indicating allocation of radio resource RBβ from base station device 200.

Each transmission unit 101 of MTC devices 100A, 100B in group A transmits target data (video data captured by the monitoring camera) to base station device 200, using radio resource RAβ. Each transmission unit 101 of MTC devices 100C, 100D in group B transmits target data (power consumption measured by the electric meter) to base station device 200, using radio resource RBβ.

(2) A common group ID is set for each of MTC devices 100A, 100B in group A. A common group ID, different from that of group A, is set for each of MTC devices 100C, 100D in group B as well.

Allocation unit 201 of base station device 200 allocates radio resource RAα common in group A, to each of MTC devices 100A, 100B having the group ID of group A. Allocation unit 201 also allocates radio resource RBα common in group B, to each of MTC devices 100C, 100D having the group ID of group B.

(3) The access enable signal (control information C1) including allocation information indicating allocation of radio resource RAβ and the access enable signal (control information C2) including allocation information indicating allocation of radio resource RBβ include a plurality of device IDs for identifying MTC devices 100 (for example, FIG. 6).

The access enable signal (control information C1) including allocation information indicating allocation of radio resource RAβ further includes a common signal format (MCS and/or TF) used by each of MTC devices 100A, 100B in group A. The access enable signal (control information C2) including allocation information indicating allocation of radio resource RBβ further includes a common signal format (MCS and/or TF) used by each of MTC devices 100C, 100D in group B.

(4) The video data transmitted by each of MTC devices 100A, 100B in group A is data based on the interleave division multiple access that is generated with interleave patterns different between MTC devices 100A, 100B. That is, even in the first group, video data is generated with different interleave patterns. Power consumption transmitted by each of MTC devices 100C, 100D in group B is data based on interleave division multiple access that is generated with interleave pattern different between MTC devices 100C, 100D.

(5) In the first application data format, the block size of data is defined at a predetermined value. In the second application data format, the block size of data is defined at a predetermined value.

(6) MTC devices 100A, 100B in group A have an image capturing function such as a monitoring camera. MTC devices 100A, 100B further have the same traffic distribution in the communication with base station device 200.

MTC devices 100C, 100D in group B have a power consumption measuring function such as an electric meter. MTC devices 100C, 100D further have the same traffic distribution in the communication with base station device 200.

F. Control Structure (f1. Sequence Chart)

Figure 13:
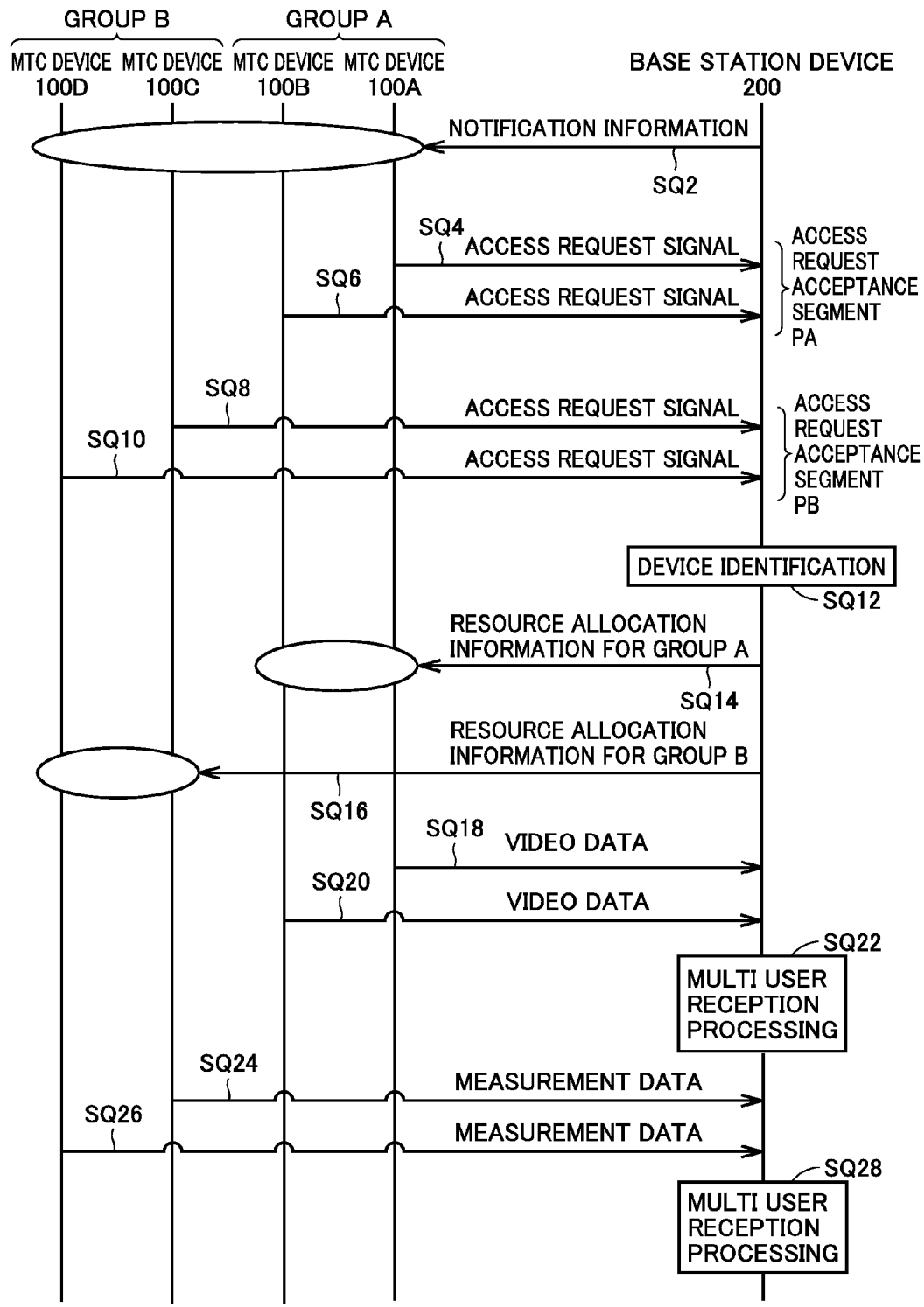
FIG. 13 is a sequence chart illustrating the procedure of the processing in the wireless communication system.

FIG. 13 is a sequence chart illustrating the procedure of the processing in wireless communication system 1. Each MTC device 100 performs position registration in advance and has an individual ID (for example, TMSI: temporary mobile subscriber identity) allocated as the device ID. The communication for position registration is not bound to the access request acceptance segment described above. Alternatively, an ID (for example, IMEI: International Mobile Equipment Identity or IMSI: International Mobile Subscriber Identity) preset in, for example, a ROM (Read Only Memory) or a USIM (Universal Subscriber Identification Module) may be used as a unique device ID, without performing position registration.

Referring to FIG. 13, in sequence SQ2, each MTC device 100 (100A to 100D) receives notification information from base station device 200. Each MTC device 100 thereby receives information of the access request acceptance segment for the group to which the device belongs to.

Here, MTC devices 100 are configured such that MTC devices 100 in each group are able to receive only the information block including information of their group. A not-shown non-MTC device (a user terminal other than MTC devices 100) is set so as not to receive such information. The notification information includes a set of PRACH resource block allocation, signal format, and available preamble sequence. The preamble sequence is a signal sequence used when an access request is transmitted. Alternatively, base station device 200 may individually announce similar information to MTC devices 100 during position registration.

In sequence SQ4, MTC device 100A in group A selects the preamble pattern associated with the device's own ID and transmits an access request signal in the designated access request acceptance segment PA. In sequence SQ6, MTC device 100B in group A selects the preamble pattern associated with the device's own ID and transmits an access request signal in the designated access request acceptance segment PA.

In sequence SQ8, MTC device 100C in group B selects the preamble pattern associated with the device's own ID and transmits an access request signal in the designated access request acceptance segment PB. In sequence SQ10, MTC device 100D in group B selects the preamble pattern associated with the device's own ID and transmits an access request signal in the designated access request acceptance segment PB.

For example, assume that the ID is provided in 16 bits, and the number of preamble patterns is 512. MTC device 100 selects the preamble pattern corresponding to the lower nine bits of the ID. The preamble pattern is determined by a preamble sequence and a cyclic shift of the preamble sequence. Assuming that the sequence length is 839 in conformity with the pattern of PRACH of LTE, the above-noted number of patterns is ensured by a shift of one sequence. To increase the number of preamble patterns, the number of patterns may be increased by using a plurality of preamble sequences, or a preamble sequence having a long sequence length may be used.

In sequence SQ12, base station device 200 detects which preamble pattern is included in each of the signals received in access request acceptance segment PA and access request acceptance segment PB, for example, using a matched filter. Base station device 200 determines MTC device 100 corresponding to the detected preamble pattern and then determines whether to perform transmission allocation. Since the IDs of MTC devices 100 have one-to-many correspondence to a preamble pattern, base station device 200 may not always uniquely specify MTC device 100. In this case, base station device 200 performs transmission allocation to a plurality of MTC devices belonging to the group for which an access request acceptance segment is set, among the IDs of MTC devices 100 corresponding to the preamble. If the number of MTC devices 100 belonging to a group is large, such measures as increasing the number of preamble patterns are taken in sequence SQ4, SQ6, SQ8, SQ10.

In sequence SQ14, base station device 200 transmits an access enable signal including resource allocation information collectively to MTC devices 100A, 100B for which transmission allocation is performed. That is, base station device 200 transmits control information C1 including resource allocation information for group A to MTC devices 100A, 100B in group A.

In sequence SQ16, base station device 200 transmits an access enable signal including resource allocation information collectively to MTC devices 100C, 100D for which transmission allocation is performed. That is, base station device 200 transmits control information C2 including resource allocation information for group B to MTC devices 100C, 100D in group B.

In sequence SQ18, MTC device 100A transmits video data to base station device 200, using the allocated radio resource. In sequence SQ20, MTC device 100B transmits video data to base station device 200, using the allocated radio resource. The video data transmitted by each of MTC device 100A and MTC device 100B is generated using IDMA. MTC devices 100A, 100B each use an interleaver having a pattern associated with the device's own ID.

In sequence SQ22, base station device 200 separately receives the signals of MTC devices 100A, 100B with the associated interleavers. The procedure of receiving the IDMA signal has been described and a description thereof is not repeated here.

In sequence SQ24, MTC device 100C transmits measurement data of power consumption, using the allocated radio resource. In sequence SQ26, MTC device 100D transmits measurement data of power consumption, using the allocated radio resource. The power consumption data transmitted by each of MTC device 100C and MTC device 100D is generated using IDMA. MTC devices 100C, 100D each use an interleaver having a pattern associated with the device's own ID.

In sequence SQ28, base station device 200 separately receives the signals of MTC devices 100C, 100D with the associated interleavers. The procedure of receiving the IDMA signal has been described and a description thereof is not repeated here.

The method described in NPD 3 does not carry out the procedure of access request and cannot identify which MTC device transmits. It is therefore necessary to try all interleavers in the base station device. However, in the method according to the present embodiment, since an access request is accepted in advance, it is only necessary to demodulate only the interleaver of MTC device 100 for which base station device 200 has performed transmission allocation.

During reception of the preamble in sequence SQ12, the state of the propagation path between MTC device 100 and base station device 200 may be determined, and the determination result may be used in sequence SQ22, SQ28.

(f2. Flowchart)

Figure 14:
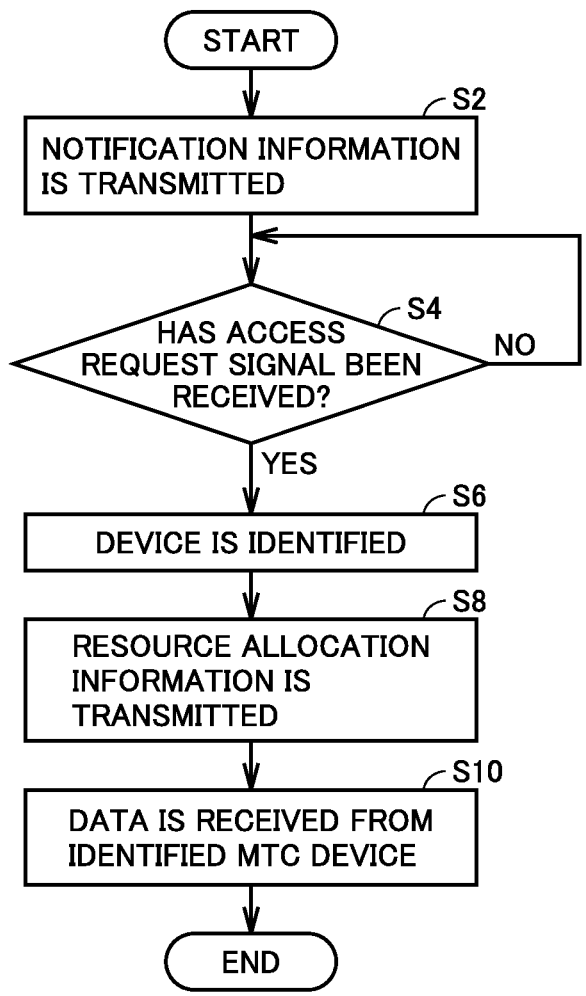
FIG. 14 is a flowchart illustrating the procedure of the processing in the base station device.

FIG. 14 is a flowchart illustrating the procedure of the processing in base station device 200. Referring to FIG. 14, in step S2, base station device 200 transmits notification information. In step S4, base station device 200 determines whether an access request signal has been received from MTC device 100.

If base station device 200 determines that an access request signal has been received (YES in step S4), the device identification described in sequence SQ12 in FIG. 13 is performed. If base station device 200 determines that an access request signal has not been received (NO in step S4), the process proceeds again to step S4.

In step S8, base station device 200 transmits access enable information (control information) including resource allocation information to the identified MTC device 100. For example, base station device 200 transmits control information C1 including resource allocation information for group A to MTC devices 100A, 100B in group A and transmits control information C2 including resource allocation information for group B to MTC devices 100C, 100D in group B.

In step S10, base station device 200 receives data (for example, video data, measurement data) from MTC device 100 identified in step S6.

Figure 15:
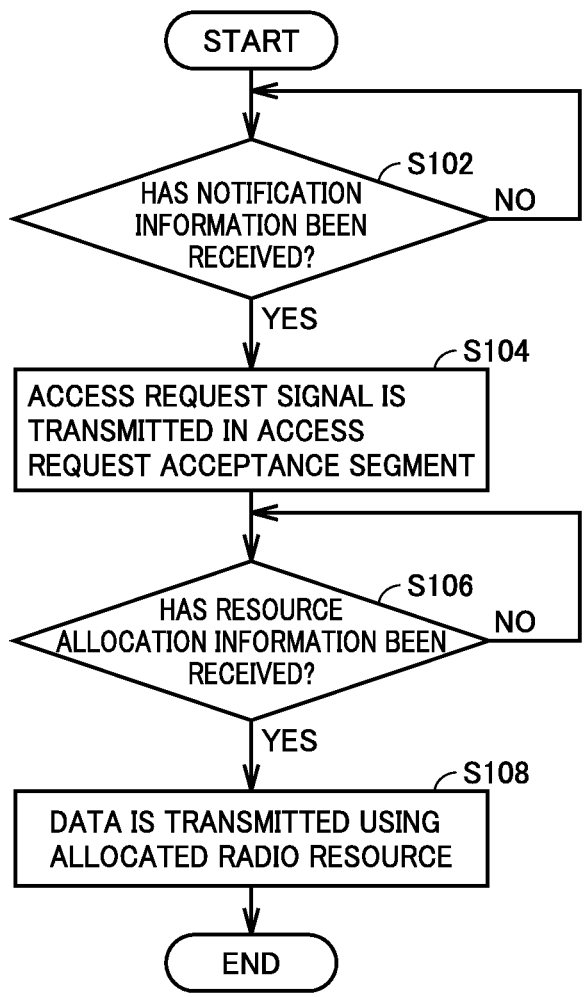
FIG. 15 is a flowchart illustrating the procedure of the processing in the MTC device.

FIG. 15 is a flowchart illustrating the procedure of the processing in MTC device 100. Referring to FIG. 15, in step S102, MTC device 100 determines whether notification information has been received from base station device 200. If it is determined that it has been received (YES in step S102), MTC device 100 transmits an access request signal in the access request acceptance segment set by base station device 200, in step S104. If it is determined that it has not been received (NO in step S102), the processing in MTC device 100 proceeds again to step S102.

In step S106, MTC device 100 determines whether access enable information including resource allocation information has been received from base station device 200. If it is determined that it has been received (YES in step S106), MTC device 100 transmits data (for example, video data, measurement data) to base station device 200, using the allocated radio resource, in step S108. If it is determined that it has not been received (NO in step S106), the processing in MTC device 100 proceeds again to step S106.

Second Embodiment

A wireless communication system 1A according to the present embodiment will now be described with reference to FIG. 16 to FIG. 20.

G. System Configuration

Figure 16:
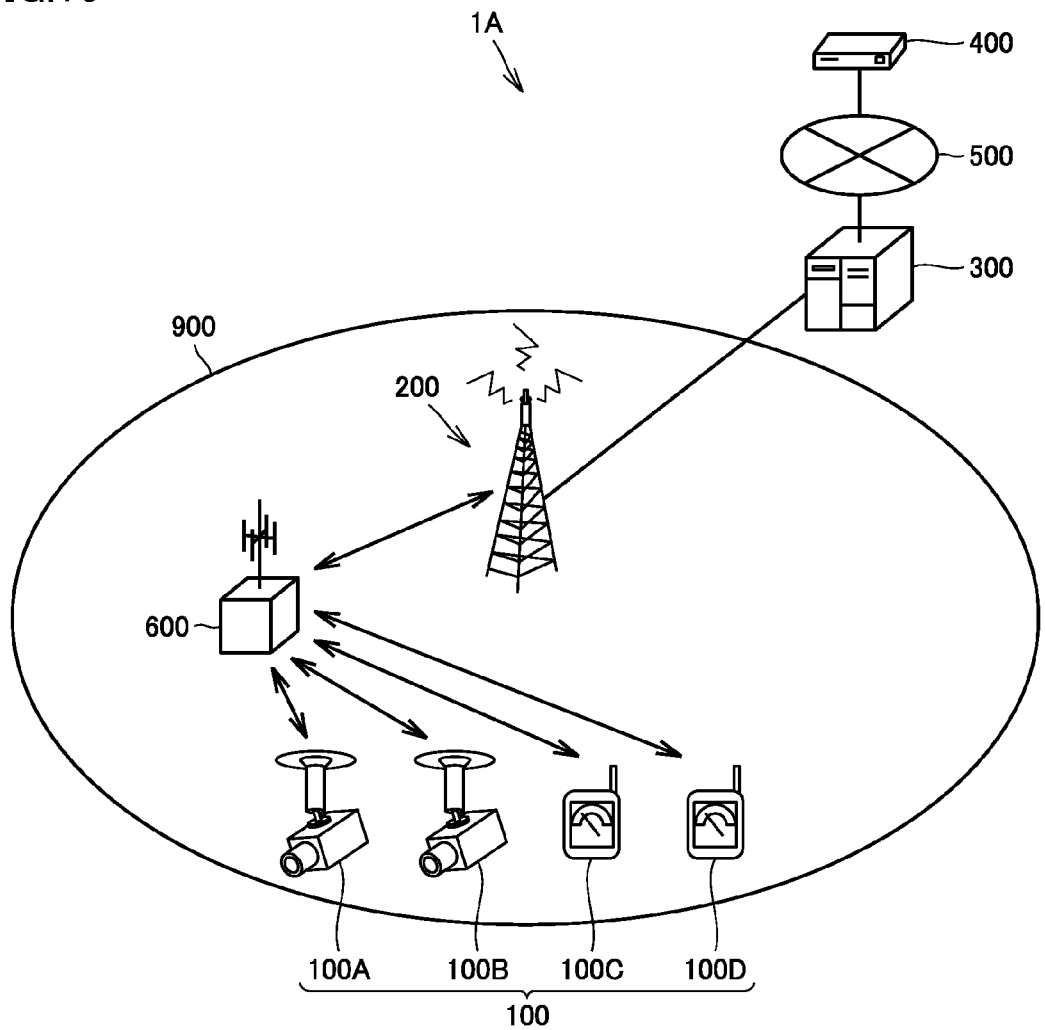
FIG. 16 is a diagram illustrating an overall configuration of another wireless communication system.

FIG. 16 is a diagram illustrating an overall configuration of wireless communication system 1A. Referring to FIG. 16, wireless communication system 1A at least includes a plurality of MTC devices 100A to 100D, base station device 200, MME 300, server device 400, and a relay device (relay node) 600. Wireless communication system 1A differs from wireless communication system 1 in the first embodiment without relay device 600, in that it includes relay device 600.

Relay device 600 has a function of relaying the communication between base station device 200 and MTC devices. FIG. 16 illustrates a state in which MTC devices 100A to 100D communicate with base station device 200 through relay device 600. The repeater described in PTD 1 above can be used as relay device 600.

H. Control Structure (Sequence Chart)

Figure 17:
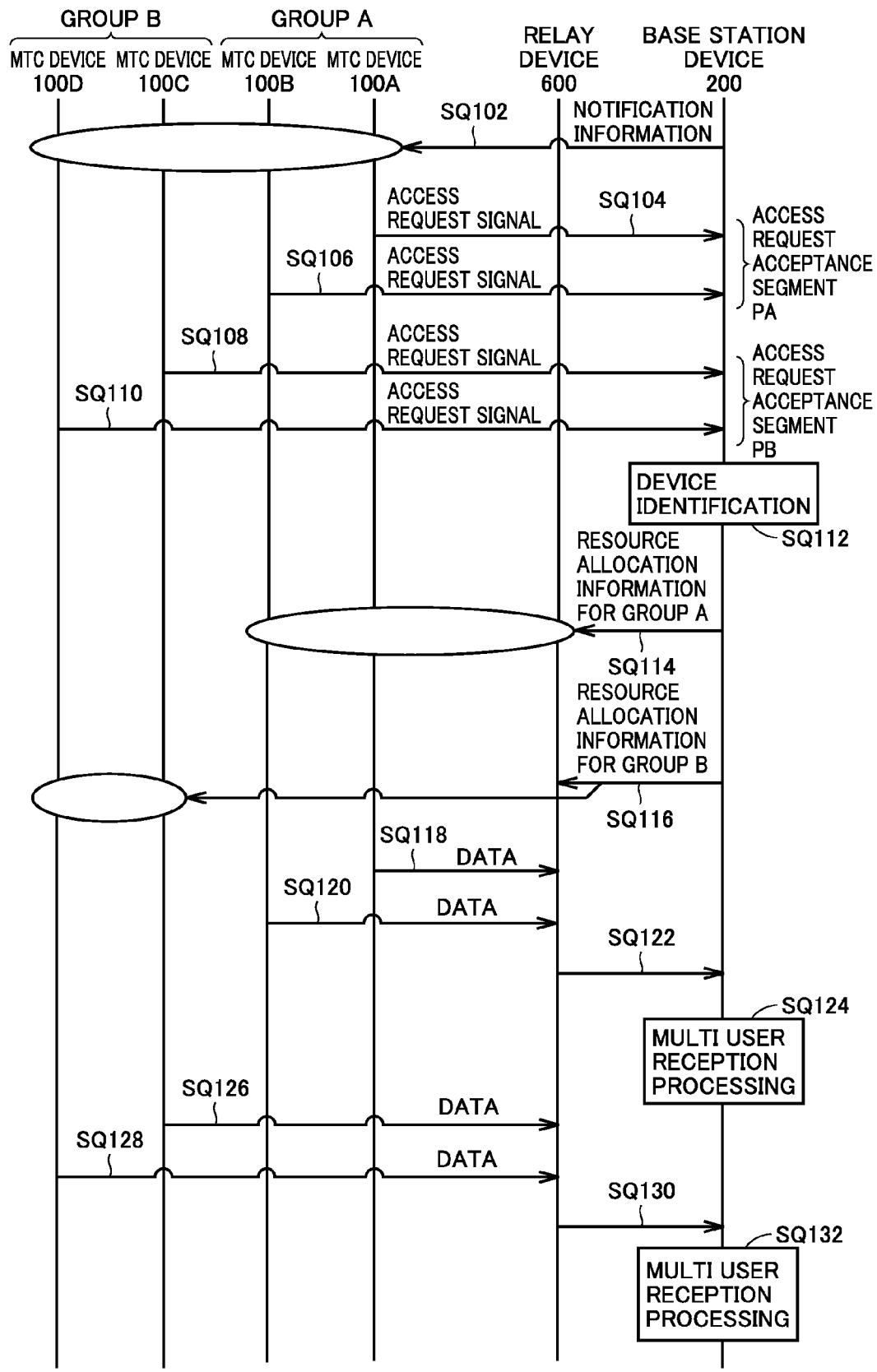
FIG. 17 is a sequence chart illustrating the procedure of the processing in the wireless communication system.

FIG. 17 is a sequence chart illustrating the procedure of the processing in wireless communication system 1A. Referring to FIG. 17, in sequence SQ102, each MTC device 100 (100A to 100D) receives notification information from base station device 200. Each MTC device 100 thereby receives information of the access request acceptance segment for the group to which the device belongs to.

In sequence SQ104, MTC device 100A in group A selects the preamble pattern associated with the device's own ID and transmits an access request signal in the designated access request acceptance segment PA. In sequence SQ106, MTC device 100B in group A selects the preamble pattern associated with the device's own ID and transmits an access request signal in the designated access request acceptance segment PA.

In sequence SQ108, MTC device 100C in group B selects the preamble pattern associated with the device's own ID and transmits an access request signal in the designated access request acceptance segment PB. In sequence SQ110, MTC device 100D in group B selects the preamble pattern associated with the device's own ID and transmits an access request signal in the designated access request acceptance segment PB.

In sequence SQ112, base station device 200 detects which preamble pattern is included in each of the signals received in access request acceptance segment PA and access request acceptance segment PB, using a matched filter. Base station device 200 identifies MTC device 100 corresponding to the detected preamble pattern and determines whether to perform transmission allocation.

Figure 18:
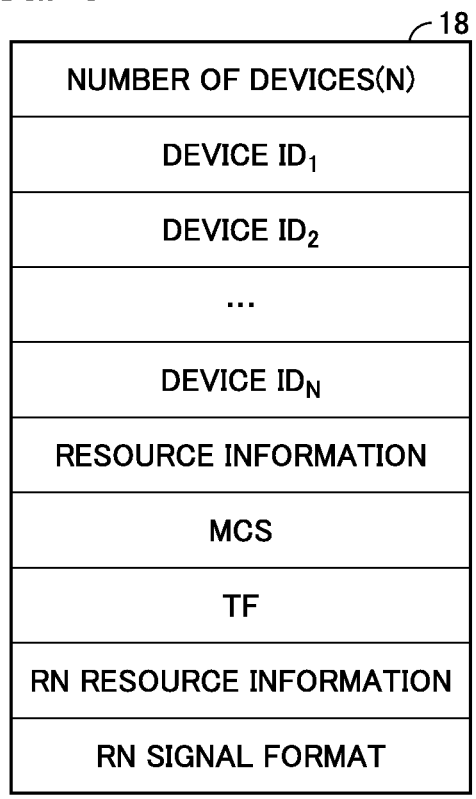
FIG. 18 is a diagram illustrating a format of resource allocation information included in the access enable signal.

In sequence SQ114, base station device 200 transmits an access enable signal including resource allocation information collectively to relay device 600 and MTC devices 100A, 100B for which transmission allocation is performed. That is, base station device 200 transmits control information C1 including resource allocation information for group A to relay device 600 and MTC devices 100A, 100B. More specifically, in sequence SQ114, base station device 200 transmits an access enable signal including resource allocation information collectively to relay device 600 and MTC devices 100A, 100B for which transmission allocation is performed, and simultaneously allocates radio resource for use in transmission from relay device 600 to base station device 200. The format of the resource allocation information included in the access enable signal will be described later (FIG. 18).

In sequence SQ116, base station device 200 transmits an access enable signal including resource allocation information collectively to relay device 600 and MTC devices 100C, 100D for which transmission allocation is performed. That is, base station device 200 transmits control information C2 including resource allocation information for group B to relay device 600 and MTC devices 100C, 100D. More specifically, in sequence SQ116, base station device 200 transmits an access enable signal including resource allocation information collectively to relay device 600 and MTC devices 100C, 100D for which transmission allocation is performed, and simultaneously allocates radio resource for use in transmission from relay device 600 to base station device 200.

In sequence SQ118, MTC device 100A performs the processing for transmitting video data to base station device 200, using the allocated radio resource. In sequence SQ120, MTC device 100B performs the processing for transmitting video data to base station device 200, using the allocated radio resource. The video data is relayed by relay device 600 in order to transmit the video data to base station device 200. It is noted that MTC devices 100A, 100B do not transmit video data to a particular relay device but transmit video data to base station device 200.

Figure 19:
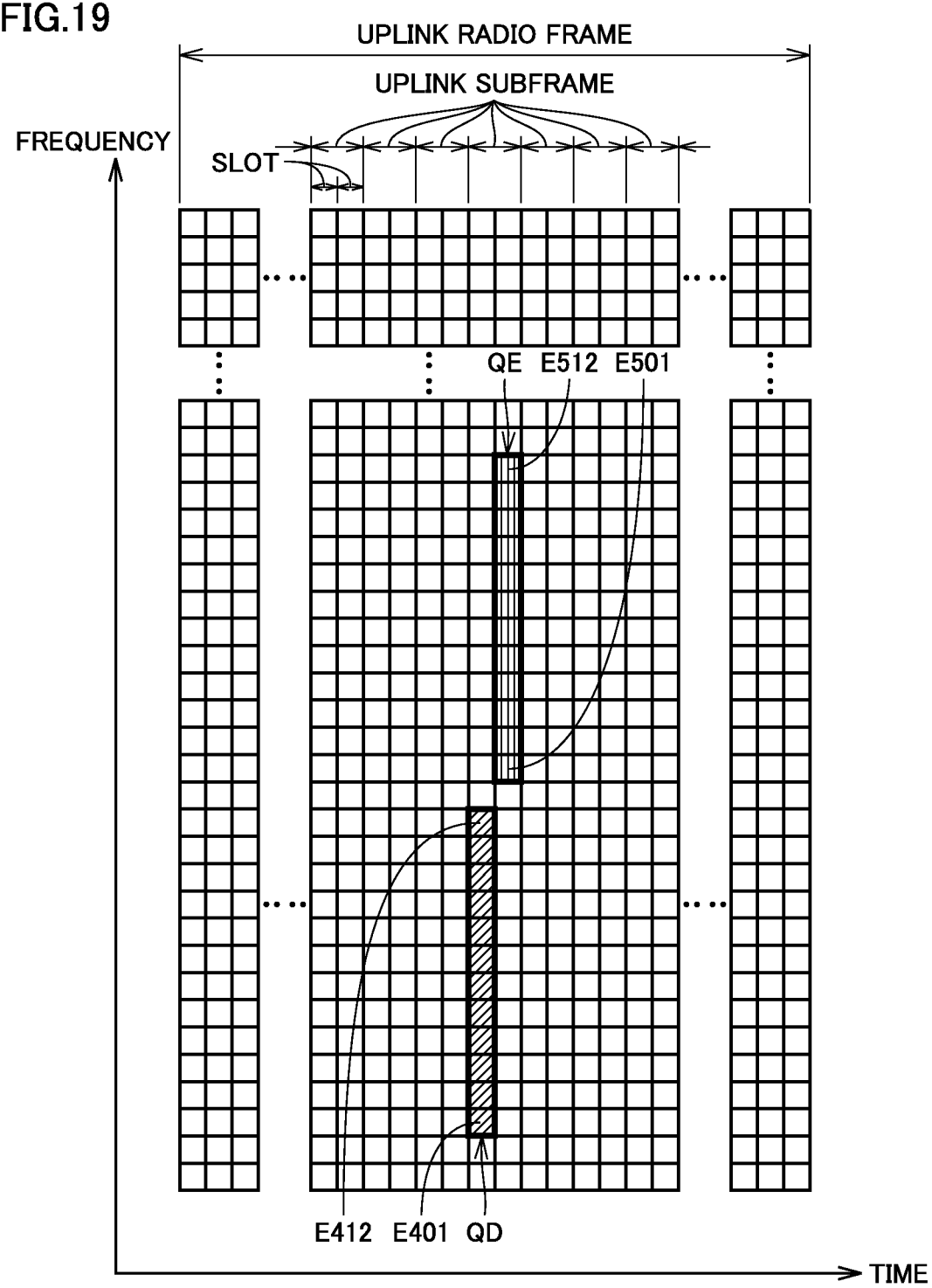
FIG. 19 is a diagram illustrating an example of the allocated resource.

In sequence SQ122, relay device 600 receives the signals transmitted by MTC devices 100A, 100B to base station device 200 and transmits the same to base station device 200. The radio resource used here will be described later (FIG. 19). Relay device 600 does not perform the MUD processing.

In sequence SQ124, base station device 200 separately receives the signals from MTC devices 100A, 100B with the associated interleavers. The procedure of receiving the IDMA signal has been described and a description thereof is not repeated here. In sequence SQ126, MTC device 100C performs the processing for transmitting measurement data of power consumption to base station device 200, using the allocated radio resource. In sequence SQ128, MTC device 100D performs the processing for transmitting measurement data of power consumption to base station device 200, using the allocated radio resource. The measurement data is relayed by relay device 600 in order to transmit the video data to base station device 200. It is noted that MTC devices 100C, 100D do not transmit video data to a particular relay device but transmit measurement data to base station device 200.

In sequence SQ130, relay device 600 receives the signals transmitted by MTC devices 100C, 100D to base station device 200 and transmits the same to base station device 200. Relay device 600 does not perform the MUD processing. In sequence SQ132, base station device 200 separately receives the signals from MTC devices 100C, 100D with the associated interleavers.

In the method in the present embodiment, an access request is accepted in advance, as also described in the first embodiment. Therefore, it is only necessary to demodulate the interleaver of MTC device 100 for which base station device 200 has performed transmission allocation. During reception of the preamble in sequence SQ112, the state of the propagation path between MTC device 100 and base station device 200 may be determined, and the determination result may be used in sequence SQ124, SQ132.

I. Data

FIG. 18 is a diagram illustrating a format of the resource allocation information included in the access enable signal (control information) used in the present embodiment. Referring to FIG. 18, with a format 18 of the resource allocation information, allocation to a plurality of devices can be announced using single resource allocation information, in the same manner as in the format 6 (FIG. 6) of the resource allocation information in the first embodiment. The format 18 includes RN resource information and RN signal format in addition to the elements in the format 6 shown in FIG. 6.

FIG. 19 is a diagram illustrating an example of the allocated resource. Specifically, FIG. 19 shows radio resource allocated to RN, in addition to the radio resource allocated to groups.

Referring to FIG. 19, for example, MTC devices 100A, 100B in group A transmit video data to base station device 200 in the allocated segment QD. The segment QD is configured with 12 resource blocks in succession in the frequency direction, in a predetermined uplink subframe in one frame. Specifically, the segment QD is a segment defined by a resource block E401 and a resource block E412.

On the other hand, a segment QE represents radio resource used by relay device 600 in sequence SQ122. The segment QE is configured with 12 resource blocks in succession in the frequency direction, in a predetermined uplink subframe in one frame. Specifically, the segment QE is a segment defined by a resource block E501 and a resource block E512.

In this case, relay device 600 does not perform the MUD processing. Relay device 600 transmits the signal received in the segment QD as it is while shifting it to the segment QE. Alternatively, relay device 600 may be configured to perform signal format conversion of the signal received from MTC device 100 and transmit the converted signal using the segment QE.

In sequence SQ124, 132, for the signals received from relay device 600, base station device 200 separately receives the signals of MTC devices 100 with the associated interleavers. However, as described with reference to FIG. 19, when the segment of resource allocation is simply shifted and signal format conversion is not performed, base station device 200 can receive the signals through the same processing as in the first embodiment.

J. Modification

Figure 20:
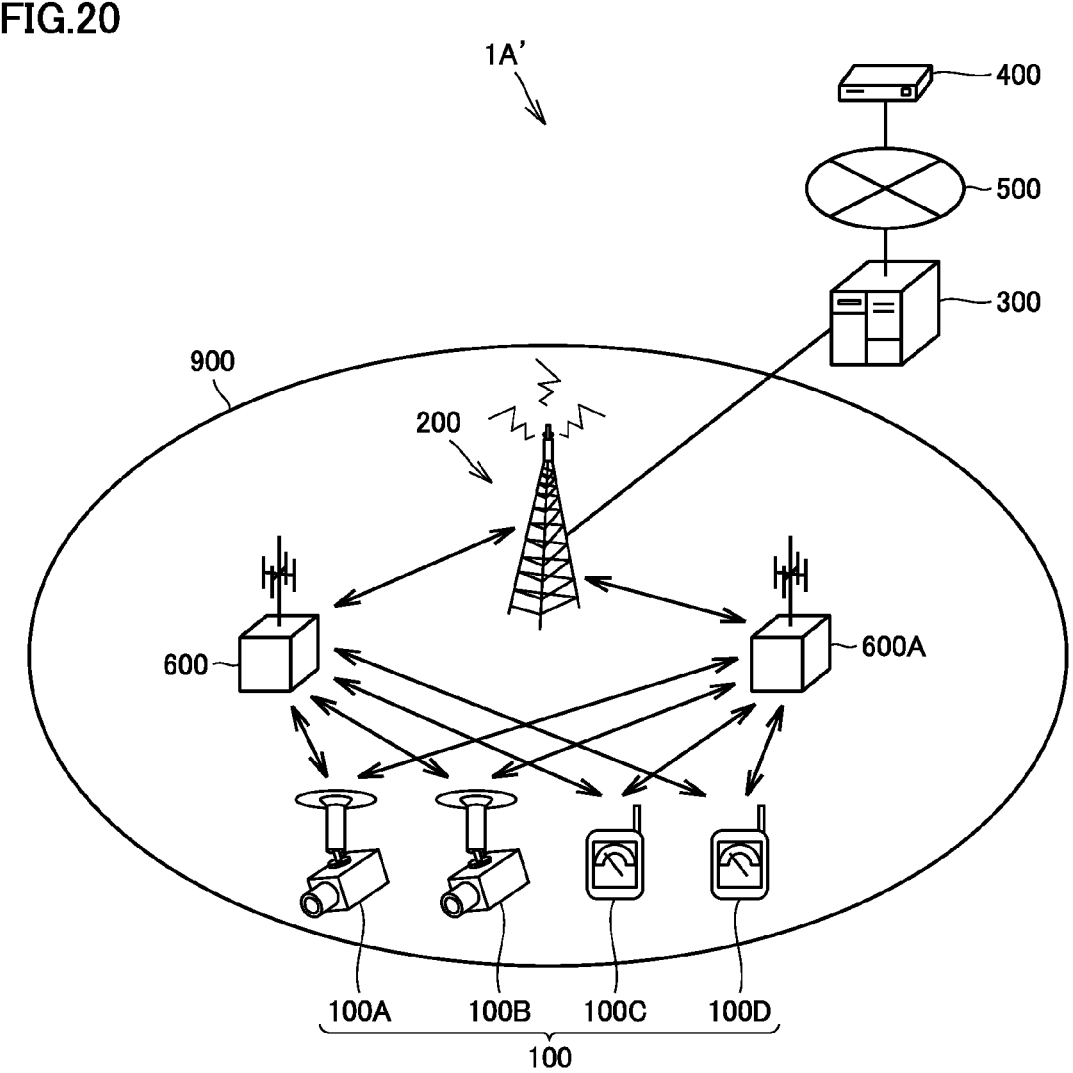
FIG. 20 is a diagram illustrating a modification of the wireless communication system.

FIG. 20 is a diagram illustrating a modification of wireless communication system 1A. Referring to FIG. 20, a wireless communication system 1A' at least includes a plurality of MTC devices 100A to 100D, base station device 200, MME 300, server device 400, relay device 600, and a relay device 600A. Wireless communication system 1A' differs from wireless communication system 1A including relay device 600 alone, in that it includes a plurality of relay devices 600, 600A.

In the case of wireless communication system 1A', although a plurality of relay devices 600, 600A relay signals of MTC devices 100, the same radio resource is used. Therefore, base station device 200 receives a synthesized signal from a plurality of relay devices 600, 600A. In this case, at base station device 200, it looks as if the number of paths from MTC devices 100 to base station device 200 increases.

Third Embodiment

A wireless communication system according to the present embodiment will now be described with reference to FIG. 24 to FIG. 29. The wireless communication system according to the present embodiment is referred to as "wireless communication system 1B" for convenience of explanation. The difference of wireless communication system 1B from wireless communication system 1A in the first embodiment is mainly described and an overlapping description is not repeated. Specifically, the description in conjunction with FIGS. 1 to 3, 6 to 12, 14, and 15 is not repeated.

K. Data Table

FIG. 24 is a diagram mainly for explaining grouping of MTC devices 100. FIG. 24 illustrates a data table which is more detailed than data table 4 in FIG. 4. Referring to FIG. 24, in data table 4A, service fields, applications, and service providers are associated with group IDs representing groups, in the same manner as in data table 4. Data table 4A is stored in base station device 200 or MME 300. The information of grouping of MTC devices 100 shown in FIG. 24 is recorded beforehand in data table 4A by the service company of MTC devices 100.

In data table 4A, the individual IDs of MTC devices included in each group and the IMEIs (International Mobile Equipment Identity) of the MTC devices are stored in association with the group ID. For example, MTC device 100A as a monitoring camera has an individual ID "00001" and IMEI "00001". MTC device 100B as a monitoring camera has an individual ID "00002" and IMEI "00002". MTC device 100C as an electric meter has an individual ID "08001" and IMEI "08001". MTC device 100D as an electric meter has an individual ID "08002" and IMEI "08002".

In the following, a configuration in which, of base station device 200 and MME 300, base station device 200 sets an access request acceptance segment for each of a plurality of groups, similarly to the first embodiment, will be described by way of example, for convenience of explanation.

L. Transmission and Reception of Notification Information

Base station device 200 allocates an individual ID and a group ID to MTC device 100 when MTC device 100 performs position registration. Base station device 200 sets, as an access request acceptance segment, the start time to start an access request (hereinafter called access request start time), the end time to terminate the access request (hereinafter called access request end time), and the period in which an access request is accepted (hereinafter called access request acceptance period). Base station device 200 transmits notification information in which the access request start time, the access request end time, and the access request acceptance period are related with each other, to MTC device 100.

Specifically, base station device 200 transmits information of the access request acceptance segment to MTC device 100 in System Information Block Type 3 (SIB3). In order to allow MTC device 100 alone to receive the information of the access request acceptance segment, base station device 200 incorporates and transmits the transmission schedule of the access request acceptance segment information into System Information Block Type 1 (SIB 1). Base station device 200 may transmit the information of the access request acceptance segment in the one other than SIB3.

Figure 25:
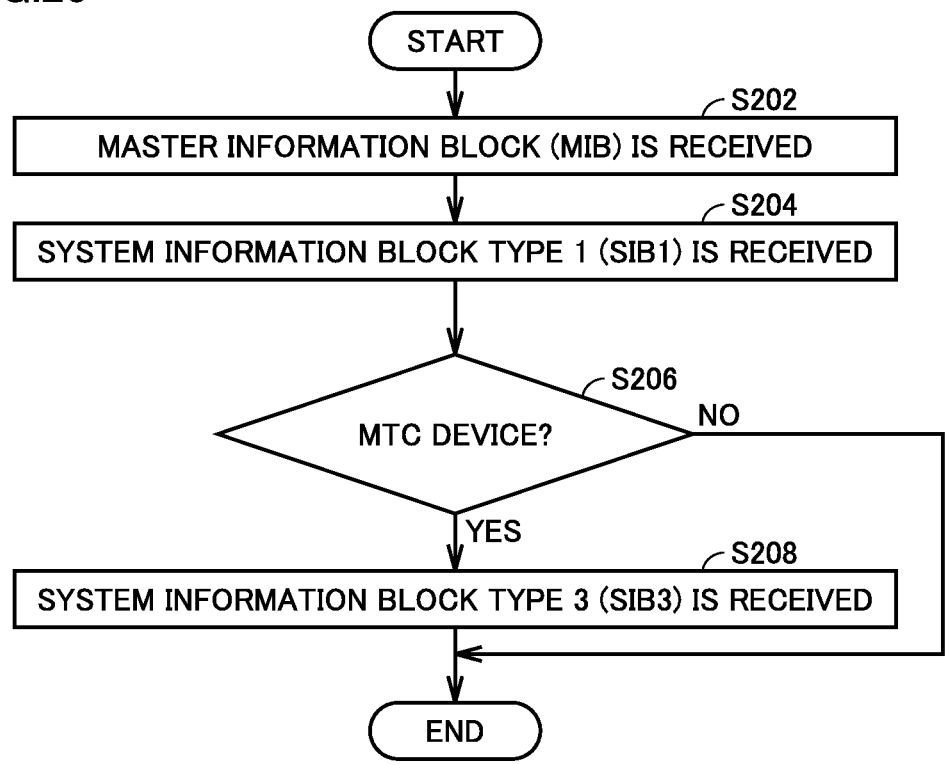
FIG. 25 is a flowchart illustrating the procedure of receiving notification information in the MTC device.

FIG. 25 is a flowchart illustrating the procedure of receiving the notification information in MTC device 100. Referring to FIG. 25, in step S202, MTC device 100 receives Master Information Block (MIB). In step S204, MTC device 100 receives SIB 1. In step S206, the device receiving SIB 1 determines whether it is an MTC device 100. If the device receiving SIB 1 is an MTC device 100 (YES in step S206), SIB3 is received in accordance with the information of SIB 1. If the device receiving SIB 1 is not an MTC device 100 (NO in step S206), SIB3 is not received. This method enables only MTC device 100 to receive the information of the access request acceptance segment.

M. Access Request Acceptance Segment

Figure 26:
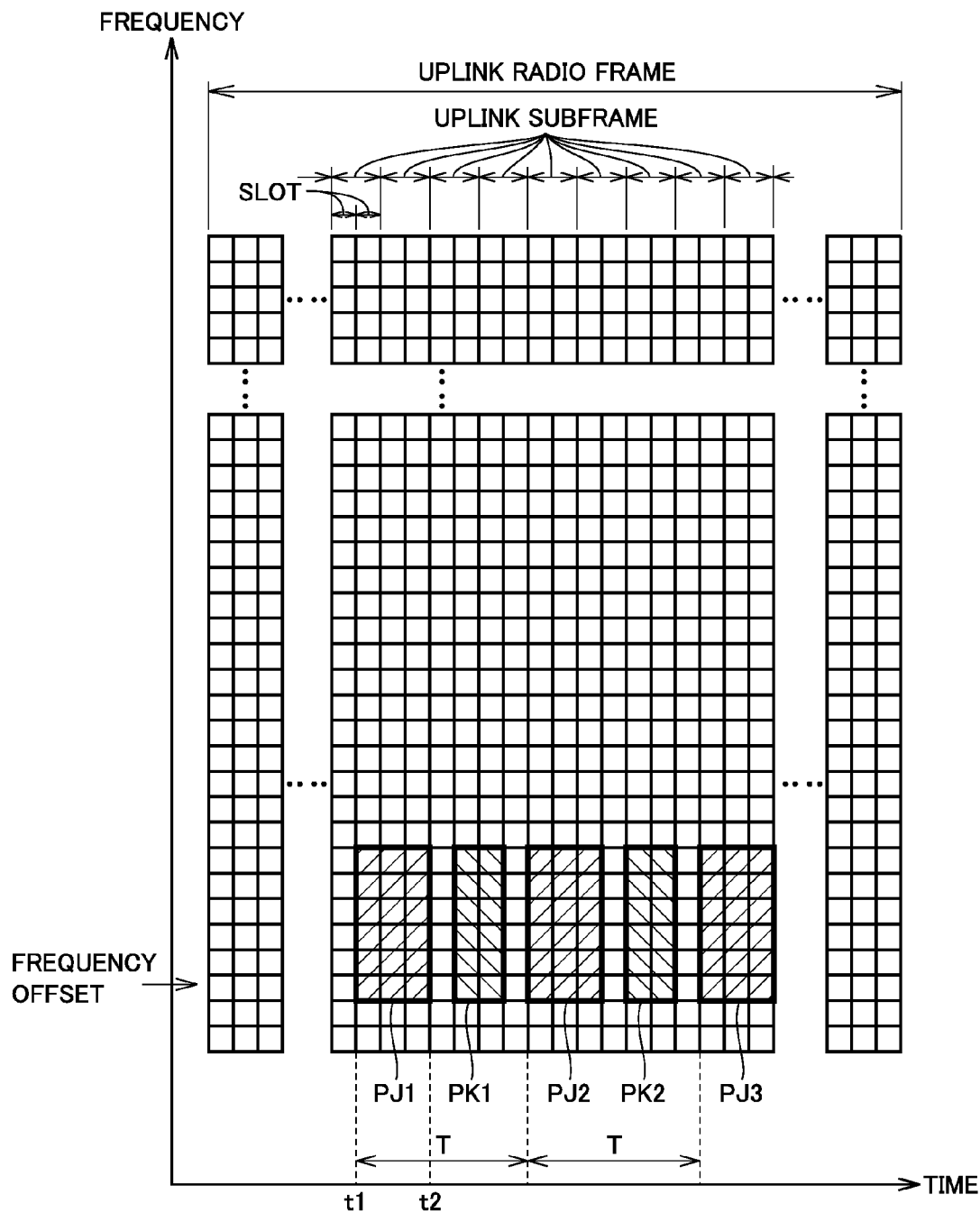
FIG. 26 is a diagram illustrating an example of the access request acceptance segment.

FIG. 26 is a diagram illustrating an example of the access request acceptance segment according to the present embodiment. Specifically, FIG. 26 is a diagram illustrating access request acceptance segments PJ1, PJ2, PJ3 allocated to group A and access request acceptance segment PK1, PK2 allocated to group B.

Referring to FIG. 26, MTC devices 100A, 100B in group A transmit an access request to base station device 200 in the allocated access request acceptance segments PJ1, PJ2, PJ3. The access request acceptance segment PJ1 is configured with in total 18 (6×3) resource blocks defined by six resource blocks in succession in the frequency direction and three resource blocks in succession in the time direction, in a predetermined subframe (uplink subframe) in one frame. Time t1 represents the access request start time for group A. Time t2 represents the access request end time for group A. Period T represents the access request acceptance period for group A.

MTC devices 100A, 100B determine access request acceptance segments PJ1, PJ2, PJ3, . . . based on the number of the frame, the number of the uplink subframe, and the frequency offset corresponding to group A. MTC devices 100C, 100D determine access request acceptance segments PK1, PK2, . . . based on the number of the frame, the number of the uplink subframe, and the frequency offset corresponding to group B. The number of the frame is repeated every 10 seconds or so, and another parameter is required to increase the interval between the segments. MTC devices 100A, 100B, 100C, 100D generate a sequence using a parameter provided by a root sequence index and perform shift processing corresponding to the device ID.

N. Control Structure

Figure 27:
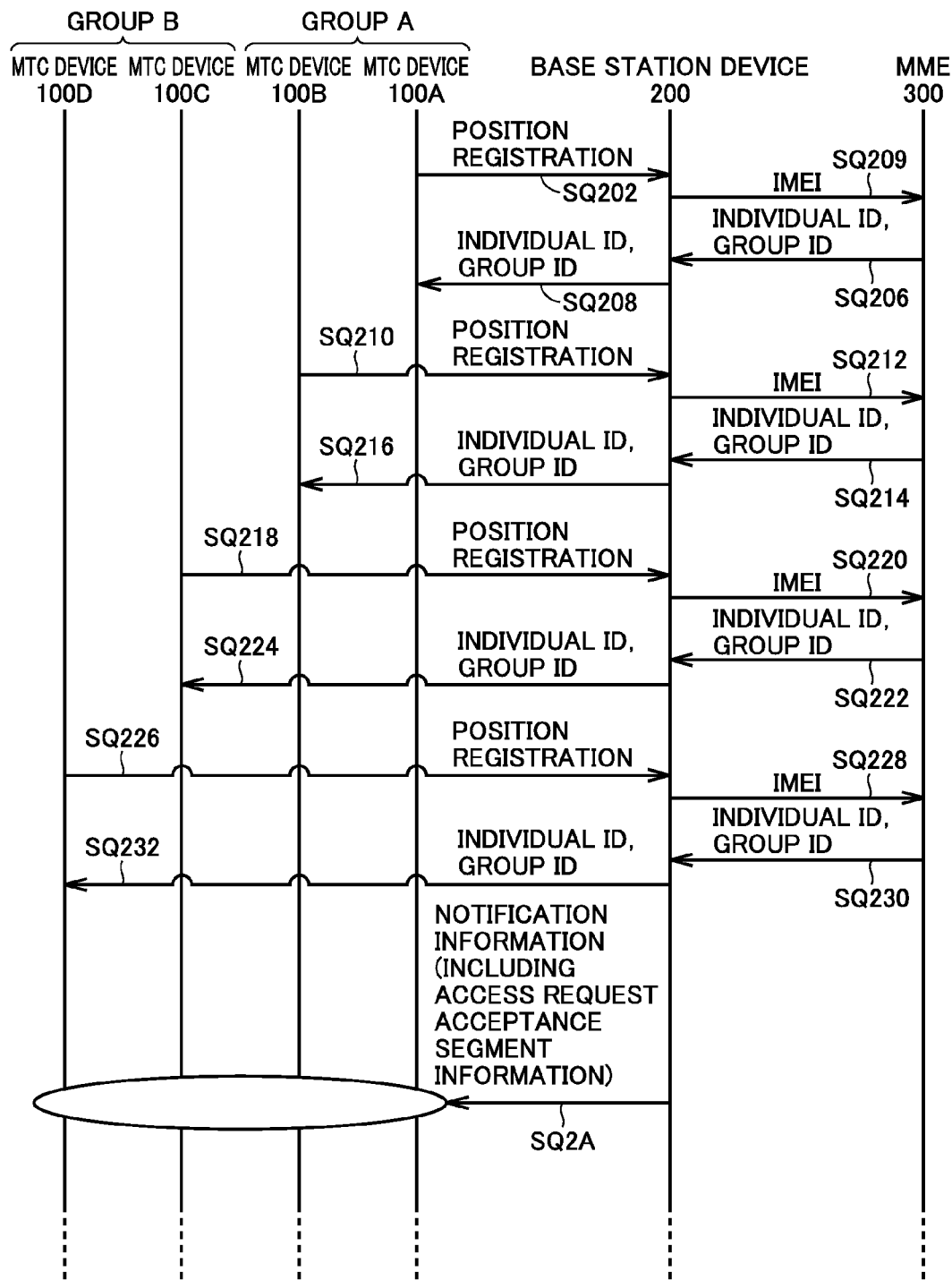
FIG. 27 is a sequence chart illustrating part of the procedure of the processing in the wireless communication system.

FIG. 27 is a sequence chart illustrating part of the procedure of the processing in wireless communication system 1B. Referring to FIG. 27, each MTC device 100 makes a position registration request to base station device 200 (sequence SQ202, SQ210, SQ218, SQ226). Upon receiving the position registration request from MTC device 100, base station device 200 transmits the IMEI of each MTC device 100 to MME 300 (sequence SQ204, SQ212, SQ220, SQ228). Base station device 200 acquires the individual ID and the group ID of each MTC device 100 from MME 300 (or a server device connected to MME 300) (sequence SQ206, SQ214, SQ222, SQ230). Base station device 200 allocates the individual ID (for example, TMSI) and the group ID to each MTC device 100 (sequence SQ208, SQ216, SQ224, SQ232).

The communication for position registration is not bound to the above-noted access request acceptance segment. Alternatively, as described in the first embodiment, an ID (for example, IMEI or IMSI) preset in, for example, a ROM or a USIM may be used as an individual device ID without performing position registration.

Sequence SQ2A will now be described. Sequence SQ2A corresponds to sequence SQ2 in FIG. 13 in the first embodiment. In sequence SQ2, base station device 200 transmits the access request acceptance segment information, namely, the access request start time, the access request end time, and the access request acceptance period, as notification information, to each MTC device 100. Specifically, base station device 200 transmits notification information in which the group ID, the access request start time, the access request end time, and the access request acceptance period are related with each other, to each MTC device 100. The notification information includes, for example, the access request start time, the access request end time, and the access request acceptance period related with the group ID of group A, and the access request start time, the access request end time, and the access request acceptance period related with the group ID of group B.

Upon receiving the notification information, each MTC device 100 makes an access request to base station device 200, using the access request start time, the access request end time, and the access request acceptance period related with the same group ID as the group ID acquired and stored in advance by the device, of a plurality of group IDs included in the notification information. For example, MTC device 100 in group A makes an access request to base station device 200 in accordance with the access request start time, the access request end time, and the access request acceptance period related with the group ID of group A.

A more specific description is given below. FIG. 28 is a diagram illustrating a transmission period for information about the access request acceptance segment and the arrangement of information about the access request acceptance segment. Referring to FIG. 28, base station device 200 transmits information (information about an access request acceptance segment) for designating (defining) an access request acceptance segment in System Information Block 3 (SIB3). In doing so, if the number of groups classified according to service kinds of MTC devices 100 is large, the notification information becomes enormous, possibly giving adverse effects on devices other than MTC devices. As measures against this situation, base station device 200 transmits information divided into a plurality of periods of SIB3, rather than transmitting information for designating the access request acceptance segments for all the groups in a period of SIB3 as shown in FIG. 28. In the example in FIG. 28, information for designating the "access request acceptance segments" for 100 groups is included in a period of SIB3. Base station device 200 notifies each MTC device 100 of the transmission schedule of information for designating the access request acceptance segment for each group, incorporated into SIB1, in order to allow MTC device 100 to receive information for designating the access request acceptance segment of its own group.

The procedure of receiving the notification information by the MTC device has been described based on FIG. 25 and a description thereof is not repeated here. As described in the first embodiment, the notification information includes a set of PRACH resource block allocation, a signal format, and an available preamble sequence.

After sequence SQ2A, in wireless communication system 1B, the processing in sequence SQ4 to SQ28 in FIG. 13 is executed as shown in FIG. 13. Here, a description of the processing in sequence SQ4 to SQ28 is not repeated here.

O. Modification (1) In the foregoing description, as in data table 4A in FIG. 25, the grouping information of MTC devices 100 is recorded beforehand in the service company of MTC devices 100, and MTC devices 100 are grouped based on this information. However, the embodiments are not limited thereto. For example, the communication status (communication frequency and/or average data block size) of MTC devices 100 may be recorded in MME 300 or another server device (for example, server device 400), and grouping may be done based on this information.

FIG. 29 is a diagram illustrating an example of a data table used for grouping. More specifically, FIG. 29 is a diagram illustrating a data table for grouping using the frequency of communication and the average data block size.

Referring to FIG. 29, base station device 200 carries out grouping according to the communication status of MTC devices. Specifically, base station device 200 performs grouping based on the frequency of communication and the value of the average data block size. Similar to data table 4A, in data table 4B, a group ID, individual IDs, and IMEIs are associated with each of a plurality of groups.

Accordingly, base station device 200 performs such processing to achieve efficiency of connection of MTC device 100 to the network, irrespective of service contents.

(2) Wireless communication system 1B according to the present embodiment may be configured to include relay device 600 as in the second embodiment (FIGS. 16 to 20).

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

1, 1A, 1A' wireless communication system, 4 data table, 100, 100A, 100B, 100C, 100D MTC device, 101, 202 transmission unit, 102, 203 reception unit, 110 CPU, 111 memory, 112 communication processing circuit, 113 wireless IF, 114 sensor, 115 converter, 116 timer, 117 power supply control circuit, 118 power supply, 200 base station device, 201 allocation unit, 210 antenna, 230 wireless processing unit, 250 baseband unit, 251 baseband circuit, 252 control device, 253 timing control unit, 254 communication interface, 255 power supply device, 300 MME, 400 server device, 600, 600A relay device, 900 cell, 2301 duplexer, 2303 power amplifier, 2305 low noise amplifier, 2307 transmission circuit, 2309 reception circuit, 2311 orthogonal modulation/demodulation unit, 2522 ROM, 2523 RAM, 2524 nonvolatile memory, E1, E6, E101, E112, E201, E210, E301, E311, E401, E412, E501, E512 resource block, PA, PB access request acceptance segment, QA, QB, QC, QD, QE segment.

The invention claimed is:

1. A wireless communication system comprising: a plurality of communication devices each performing machine communication; and a base station device performing wireless communication with the plurality of communication devices, wherein, of the plurality of communication devices, each of communication devices in a first group that transmits data to the base station device using a first application data format is allocated first radio resource common in the first group, each of the communication devices in the first group including a first transmission unit for transmitting, to the base station device, a request signal for requesting access to the base station device, using the first radio resource, the base station device including a first reception unit for receiving the request signal from each of the communication devices in the first group, an allocation unit for allocating second radio resource common in the first group to each of the communication devices that has transmitted the request signal, and a second transmission unit for transmitting first control information including allocation information indicating allocation of the second radio resource, to each of the communication devices that has transmitted the request signal, each of the communication devices in the first group further including a second reception unit for receiving the first control information from the base station device, wherein the first transmission unit further transmits the data to the base station device using the second radio resource.

2. The wireless communication system according to claim 1, wherein of the plurality of communication devices, each of communication devices in a second group that transmits data to the base station device using a second application data format is allocated third radio resource common in the second group, each of the communication devices in the second group includes a third transmission unit for transmitting, to the base station device, a request signal for requesting access to the base station device, using the third radio resource, the first reception unit further receives the request signal from each of the communication devices in the second group, the allocation unit allocates fourth radio resource common in the second group, to each of the communication devices in the second group that has transmitted the request signal, the second transmission unit further transmits second control information including allocation information indicating allocation of the fourth radio resource, to each of the communication devices in the second group that has transmitted the request signal, each of the communication devices in the second group includes a third reception unit for receiving the second control information from the base station device, and the third transmission unit further transmits the data to the base station device, using the fourth radio resource.

3. The wireless communication system according to claim 2, wherein each of the communication devices in the first group stores a first group identifier common to each of the communication devices in the first group, each of the communication devices in the second group stores a second group identifier common to each of the communication devices in the second group, the base station device transmits predetermined notification information in order to allocate the first radio resource to each of the communication devices in the first group and to allocate the third radio resource to each of the communication devices in the second group, and the notification information includes information of a first start time to start an access request to the base station device, information of a first end time to terminate the access request, and information representing a first period in which the access request is accepted, in relation with the first group identifier, and information of a second start time to start an access request to the base station device, information of a second end time to terminate the access request, and information representing a second period in which the access request is accepted, in relation with the second group identifier.

4. The wireless communication system according to claim 3, wherein each of the communication devices in the first group transmits the request signal in accordance with the first start time, the first end time, and the first period related with the first group identifier, and each of the communication devices in the second group transmits the request signal in accordance with the second start time, the second end time, and the second period related with the second group identifier.

* * * * *